United States Patent
Harrell

(10) Patent No.: US 12,474,101 B2
(45) Date of Patent: Nov. 18, 2025

(54) SYSTEM AND METHOD FOR ICE MANUFACTURING

(71) Applicant: Minnesota Ice Sculptures L.L.C., St. Paul, MN (US)

(72) Inventor: Robert E. Harrell, St. Paul, MN (US)

(73) Assignee: Minnesota Ice Sculptures L.L.C., St. Paul, MN (US)

( * ) Notice: Subject to any disclaimer, the term of this patent is extended or adjusted under 35 U.S.C. 154(b) by 0 days.

(21) Appl. No.: 18/430,082

(22) Filed: Feb. 1, 2024

(65) Prior Publication Data

US 2024/0175618 A1 May 30, 2024

Related U.S. Application Data

(63) Continuation of application No. 17/243,565, filed on Apr. 28, 2021, now Pat. No. 11,898,784.
(Continued)

(51) Int. Cl.
*F25C 1/18* (2006.01)
*F25C 1/12* (2006.01)
(Continued)

(52) U.S. Cl.
CPC .............. *F25C 1/18* (2013.01); *F25C 1/12* (2013.01); *F25C 1/25* (2018.01); *F25C 5/14* (2013.01); *F25C 5/18* (2013.01); *F25C 2700/04* (2013.01)

(58) Field of Classification Search
CPC ...... F25C 1/18; F25C 1/25; F25C 1/12; F25C 5/14; F25C 5/18; F25C 2700/04
See application file for complete search history.

(56) References Cited

U.S. PATENT DOCUMENTS

| 706,510 A | 8/1902 | Barrath |
| 1,159,711 A | 11/1915 | Rich |
(Continued)

FOREIGN PATENT DOCUMENTS

| KR | 20180010474 A | 1/2018 |
| NL | 1007214 C2 | 4/1999 |
(Continued)

OTHER PUBLICATIONS

Hellmann, Process for generating an ice layer, in particular for model ship tests, 1991, Full Document (Year: 1991)*
(Continued)

*Primary Examiner* — Nael N Babaa
(74) *Attorney, Agent, or Firm* — Winthrop & Weinstine, P.A.

(57) ABSTRACT

A system for manufacturing clear ice products is provided. The system includes a freezing module, a demolding module, and a converting station. The freezing module includes a frame comprising a plurality of levels, a plate freezer provided at each level, and at least one mold provided for placement on each plate freezer and suitable for receiving water. A control frame is provided associated with each plate freezer and is movable from an elevated position to fill position. In the fill position, the control frame is at least partially disposed within the mold. One or more circulation pumps are associated with each control frame for circulating water in the mold to release air bubbles as the water freezes. The demolding module removes the mold from the freezing module and removes formed ice from the mold. The converting station converts the formed ice into a clear ice product.

19 Claims, 31 Drawing Sheets

Related U.S. Application Data

(60) Provisional application No. 63/016,783, filed on Apr. 28, 2020.

(51) Int. Cl.
  *F25C 1/25* (2018.01)
  *F25C 5/14* (2006.01)
  *F25C 5/18* (2018.01)

(56) References Cited

U.S. PATENT DOCUMENTS

| | | | |
|---|---|---|---|
| 1,745,277 A | | 1/1930 | Shipman |
| 2,182,454 A | * | 12/1939 | Sherman .................. F25C 1/24 62/353 |
| 2,280,049 A | * | 4/1942 | Turner ..................... F25C 5/14 83/425.3 |
| 2,506,614 A | | 5/1950 | Ribeiro |
| 2,575,892 A | | 11/1951 | Roberts et al. |
| 3,261,383 A | | 7/1966 | Coblentz |
| 3,762,181 A | | 10/1973 | Leidig |
| 4,655,403 A | | 4/1987 | Sciortino |
| 4,688,386 A | * | 8/1987 | Lane ........................ F25C 5/10 62/348 |
| 5,503,519 A | | 4/1996 | Schwetz et al. |
| 9,581,372 B2 | | 2/2017 | Lee et al. |
| 11,614,277 B2 | | 3/2023 | Pankaj |
| 11,692,753 B2 | | 7/2023 | Harrell |
| 2003/0106327 A1 | | 6/2003 | Zevlakis |
| 2007/0186571 A1 | | 8/2007 | Kopf |
| 2012/0031054 A1 | | 2/2012 | Broadbent |
| 2012/0096890 A1 | * | 4/2012 | Mitchell .................. F25C 5/22 62/347 |
| 2013/0327068 A1 | | 12/2013 | Lee et al. |
| 2014/0165610 A1 | | 6/2014 | Boarman et al. |
| 2014/0165624 A1 | | 6/2014 | Boarman et al. |
| 2015/0114012 A1 | | 4/2015 | Jafa et al. |
| 2017/0030624 A1 | | 2/2017 | Boarman et al. |
| 2019/0204000 A1 | | 7/2019 | Flores |
| 2020/0033042 A1 | | 1/2020 | Junge et al. |
| 2020/0182535 A1 | | 6/2020 | Scalf |
| 2022/0243971 A1 | | 8/2022 | Harrell |
| 2023/0341164 A1 | | 10/2023 | Harrell |

FOREIGN PATENT DOCUMENTS

| | | |
|---|---|---|
| WO | WO1992008935 A1 * | 11/1991 |
| WO | 2017203703 A1 | 11/2017 |
| WO | 2018198177 A1 | 11/2018 |

OTHER PUBLICATIONS

International Search Report received for PCT Patent Application No. PCT/US2021/029765, mailed on Jul. 27, 2021, 2 pages.

Non Final Office Action in related U.S. Appl. No. 17/243,565, filed Mar. 13, 2023, 23 pages.

Screen captures from YouTube video clip entitled Clinebell CI-4 Operation, 7,278 views Sep. 7, 2018. https://www.youtube.com/watch?v=0i4ddhS82_s (Year: 2018), 14 pages.

Written Opinion received for PCT Patent Application No. PCT/US2021/029765, mailed on Jul. 27, 2021, 6 pages.

Non-Final Office Action in U.S. Appl. No. 18/215,728, mailed on Jul. 9, 2024, 26 pages.

United States International Searching Authority, International Search Report and Written Opinion Mailed Jul. 23, 2025, as Received in International Application No. PCT/US2025/028728.

* cited by examiner

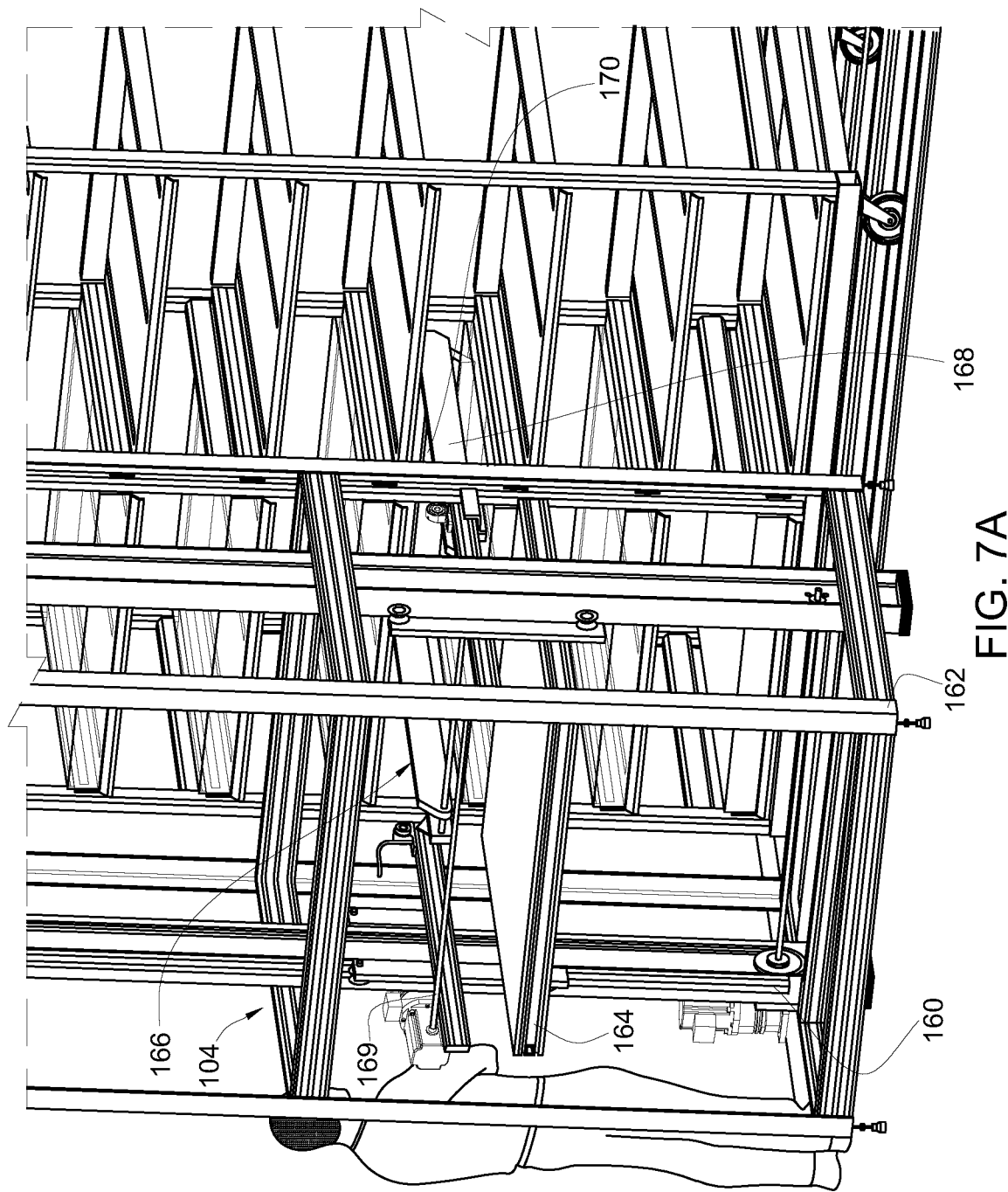

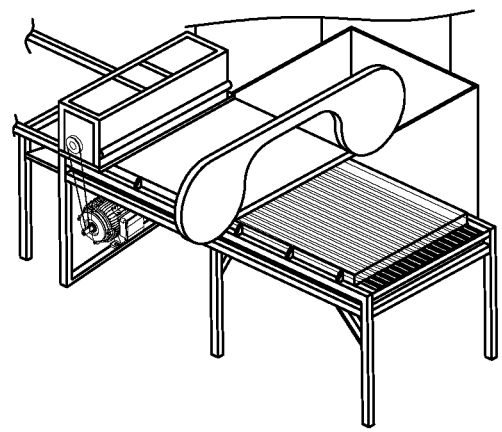
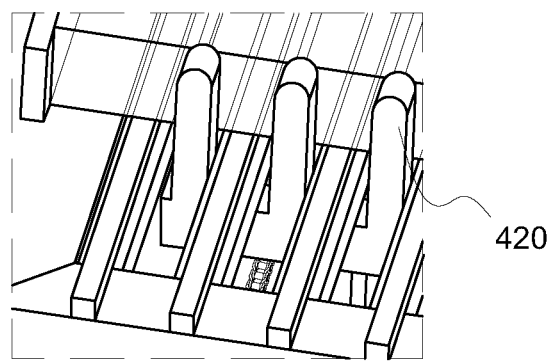
420
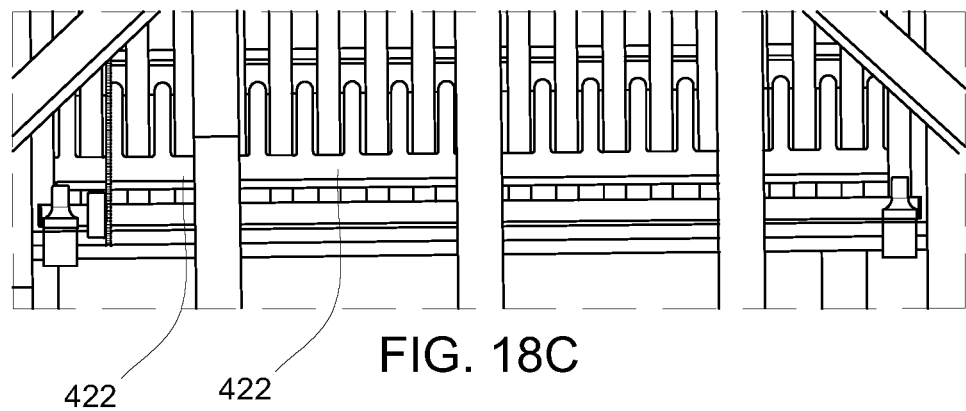
422   422   FIG. 18C

SYSTEM AND METHOD FOR ICE MANUFACTURING

CROSS-REFERENCE TO RELATED APPLICATIONS

The present application is a Continuation of U.S. Utility application Ser. No. 17/243,565, filed 28 Apr. 2021, which claims priority to Provisional Application No. 63/016,783, filed 28 Apr. 2020, and the contents of which are hereby incorporated by reference herein in their entirety. A claim of priority to all, to the extent appropriate, is made. The present application is also related to U.S. application Ser. No. 17/727,616, filed on 22 Apr. 2022, and Ser. No. 18/215,728, filed on 28 Jun. 2023.

FIELD OF THE INVENTION

The present disclosure relates to novel and advantageous systems and methods for manufacturing ice. In particular, the present disclosure relates to novel and advantageous systems and methods for rapid manufacture of clear ice in an automated or semi-automated fashion.

BACKGROUND OF THE INVENTION

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

There are many industries in which ice is used. The ice manufacturing industry makes ice for various uses by causing water to freeze and shaping the ice as desired. Shaping can be done while the water is freezing, by providing the water in a shaped mold, or by shaping the ice after the water is frozen, for example by cutting the ice. Different sizes of ice blocks have been formed using different sizes of molds. Approximately three hundred pound ice blocks are considered large format ice blocks.

Current systems and methods for creating clear ice are time consuming and wasteful. The process of making clear ice requires slow freezing of water with constant circulation. The water is slowly circulated to remove air bubbles from the water. If the air is not removed, then the water freezes with air bubbles, giving the ice an opaque and cloudy appearance. The freezing process can take several days for large blocks of ice.

FIG. 1a illustrates an example of a prior art clear ice block maker 10 capable of producing a large format ice block. The clear ice block maker 10 comprises a cooling unit 12, a cabinet 14, and an agitator. The cooling unit 12 includes a refrigerant and refrigeration system and is located at the bottom of the clear ice block maker 10. The cabinet 12 is a galvanized steel chamber. The cabinet 12 includes two chambers 16, each configured to hold up to 40 gallons of water and make an ice block with dimensions of, for example, 40"×20"×10". The agitator is a pump that circulates the water at a constant single speed. The clear ice block maker 12 requires disposable single use liners for making ice. The single-use liners facilitate holding the water in the proper shape (of the chamber) during the freezing process. This prevents the water from leaking out which causes the cooling unit to freeze up. The liners ensure that the ice does not freeze to the chambers. The liners also facilitate the removal of the ice from the chambers. Since small pieces of ice can be sharp, the liners can get ripped or torn during the removal process. The liners are also used to ensure the ice blocks do not stick to the final packaging once they are boxed. The liners are also used to "Help" make the ice more food safe. Because galvanized steel is not FDA approved for contact with food, the liners are also used to make the ice food safe.

To make ice, a liner is set in a chamber 16. The liners need to be carefully placed in the chambers to minimize creases, otherwise, the ice block may have small defects on 5 of the 6 sides. The liner is secured in place by a bolt structure that pierces the liner. Clips are "Set" on top of the chamber and liner and are intended to be frozen into the ice. The clips then may be used to facilitate the lifting of the liner and ice out of the chamber. Extraction of large ice blocks with the clips can be dangerous. More specifically, clips and hoists can break during the extraction process.

To freeze the water, the cooling unit 12 and agitator are turned on. Freezing of the water happens directionally. More specifically, the cooling unit 12 freezes from the bottom up. Ice is a good insulator and inhibits thermal heat transfer. As ice forms and freezing moves upwardly, the rate of freezing decreases because of the thickness of the ice. In general it can take approximately 2-3 days to freeze approximately 40 gallons of water. FIG. 1b illustrates a prior art block hoist 20. FIG. 1c illustrates a prior art block tilt cart 30. Once the water is frozen the clips are attached to a block hoist 20. The block hoist 20 lifts the ice blocks out of the chamber and then needs to be manually pulled out and away from the machine. The block is then lowered via the hoist onto a block tilt cart 30. Ice block tilt carts 30 are used to transfer the ice and can be dangerous as the ice blocks can slide off of them while being moved.

The formed ice block typically is 20" wide×40" long with a variable height depending on when the ice is removed. The top surface may be uneven because of the circulation of water during freezing. In some instances, for example, if the ice is frozen too quickly, a pump or pumps were to fail, and or if the pumps were not set properly (Depth) to circulate the water depending on how much ice has been frozen, the ice may have cloudy portions. The ice block can be manually trimmed to uniform thickness and to remove cloudy portions if necessary, but this can be dangerous and labor-intensive. The ice block can further be cut to the desired size and shape. For example the clear pieces may be cut into sculptures, cocktail cubes, or other ice creations. These processes are extremely labor intensive and require a vast amount of skill and expertise. The ice is manually moved from the ice block maker 10 to a platform for cutting using gloves and tools move the ice onto platforms for cutting. A great deal of care has to be taken to ensure safety and cleanliness. It is also difficult to minimize breakage or waste.

Significantly, the formed blocks of ice are generally a minimum of 10 inches thick. This is to ensure anchoring of the clips in the ice and to eliminate or reduce cracking that results from lifting the liner out of the mold. The rate of water freezing into ice decreases rapidly when the ice is more the two inches thick and continues to freezer slower and slower as each inch freezes due to the decreased thermal conductivity of the ice. There is currently no way to freeze and safely remove only 2-5" of ice using the prior art ice makers.

The liners used with the clear ice maker are made by hand to ensure that the seal points are strong. The liners are single use so that there is no risk of leakage.

There is a need in the art for an efficient, less labor-intensive, safer, and less wasteful system and method for manufacturing clear dense ice.

BRIEF SUMMARY OF THE INVENTION

The following presents a simplified summary of one or more embodiments of the present disclosure in order to provide a basic understanding of such embodiments. This summary is not an extensive overview of all contemplated embodiments, and is intended to neither identify key or critical elements of all embodiments, nor delineate the scope of any or all embodiments.

The present disclosure relates to novel and advantageous systems and methods for manufacturing ice. In particular, the present disclosure relates to novel and advantageous systems and methods for rapid manufacture of clear ice in an automated or semi-automated fashion.

In one embodiment, a freezing module for creating clear ice sheets is provided. The freezing module includes a frame comprising a plurality of levels, a plate freezer provided at each level, and at least one mold provided for placement on each plate freezer and suitable for receiving water. A control frame is provided associated with each plate freezer, wherein the control frame is movable from an elevated position to fill position, wherein in the fill position, the control frame is at least partially disposed within the mold. One or more circulation pumps are associated with each control frame, wherein the circulation pumps circulate water in the mold to release air bubbles as the water freezes. In some embodiments, a freeze frame may be provided for each mold, wherein the freeze frame has an open bottom and provides structural support to the mold.

In another embodiment, a system for manufacturing clear ice products is provided. The system includes a freezing module, a demolding module, and a converting station. The freezing module includes a frame comprising a plurality of levels, a plate freezer provided at each level, and at least one mold provided for placement on each plate freezer and suitable for receiving water. A control frame is provided associated with each plate freezer, wherein the control frame is movable from an elevated position to fill position, wherein in the fill position, the control frame is at least partially disposed within the mold. One or more circulation pumps are associated with each control frame, wherein the circulation pumps circulate water in the mold to release air bubbles as the water freezes. The demolding module includes a shelf, a lift, and a push/pull mechanism. The lift brings the shelf to a height to remove a mold from the a level of the freezing module. The push/pull mechanism is used to move the mold from the freezing module onto the shelf. The converting station converts the ice to a clear ice product. The converting station may comprise a plurality of substations including a trim module, a customization module, and a shaping module. The shaping module may comprise a crushing substation, a rod substation, a cube substation, or a sphere substation.

In yet a further embodiment, a system for manufacturing ice products is provided. The system includes a freezing module and a demolding module. The freezing module includes a frame comprising a plurality of levels, a plate freezer provided at each level, and at least one mold provided for placement on each plate freezer and suitable for receiving water. A control frame is provided associated with each plate freezer, wherein the control frame is movable from an elevated position to fill position, wherein in the fill position, the control frame is at least partially disposed within the mold. One or more circulation pumps are associated with each control frame, wherein the circulation pumps circulate water in the mold to release air bubbles as the water freezes. The demolding module includes a shelf, a life, a push/pull mechanism, and a demold mechanism. The lift brings the shelf to a height to remove a mold from the a level of the freezing module. The push/pull mechanism is used to move the mold from the freezing module onto the shelf. The demold mechanism removes formed ice from the mold and may include a plurality of grippers for gripping the ice in the mold.

While multiple embodiments are disclosed, still other embodiments of the present disclosure will become apparent to those skilled in the art from the following detailed description, which shows and describes illustrative embodiments of the invention. As will be realized, the various embodiments of the present disclosure are capable of modifications in various obvious aspects, all without departing from the spirit and scope of the present disclosure. Accordingly, the drawings and detailed description are to be regarded as illustrative in nature and not restrictive.

BRIEF DESCRIPTION OF THE DRAWINGS

While the specification concludes with claims particularly pointing out and distinctly claiming the subject matter that is regarded as forming the various embodiments of the present disclosure, it is believed that the invention will be better understood from the following description taken in conjunction with the accompanying Figures, in which:

FIG. 7a illustrates a demold module, in accordance with one embodiment.

FIG. 18c illustrates a saw layout for a shaping substation, in accordance with a third embodiment.

DETAILED DESCRIPTION

The present disclosure relates to novel and advantageous systems and methods for manufacturing ice. In particular, the present disclosure relates to novel and advantageous systems and methods for rapid manufacture of clear, dense ice in an automated or semi-automated fashion.

In accordance with various embodiments, a clear ice freezing module is provided. The freezing module, also referred to as a freezing unit or an ice module, may be incorporated in a system for manufacturing ice. In some embodiments, the system for manufacturing ice may be substantially automated. The system is generally efficient, less labor intensive, and less wasteful system than existing systems. Further, the system is compliant with food regulations, is clean, and reduces risk to laborers.

The freezing module freezes water into clear ice sheets or slabs. The sheets are a form factor that is amenable to a wide variety of clear ice uses. Using the system and method, the sheets may be processed into final ice products in a fashion that can scale to the needs of different production environments. The freezing module produces clear ice much faster and more safely than currently available ice makers.

The system for ice manufacture produces finished ice products without the need for specialized knowledge and expertise. The system for ice manufacture produces finished ice products more quickly and with significantly less waste than currently available methods. In some embodiments, the system eliminates the need for hand-held blades and saws prevalent in current ice making methods. Further, the system may be configured such that the formed ice is kept in a sanitary condition through processing and packaging is not handled or exposed to the environment.

Figure 1A:
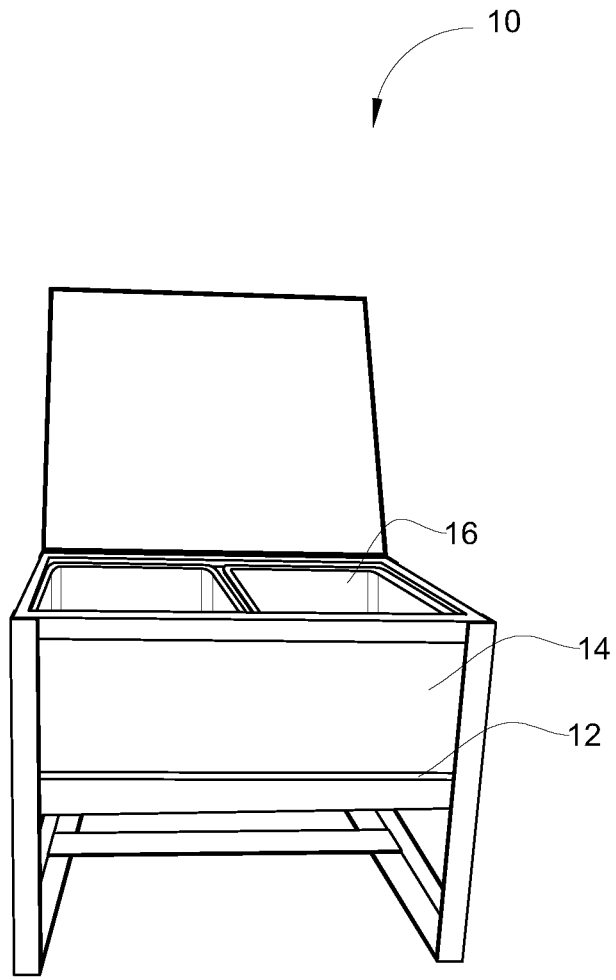
FIG. 1a illustrates a prior art ice maker.
Figure 1B:
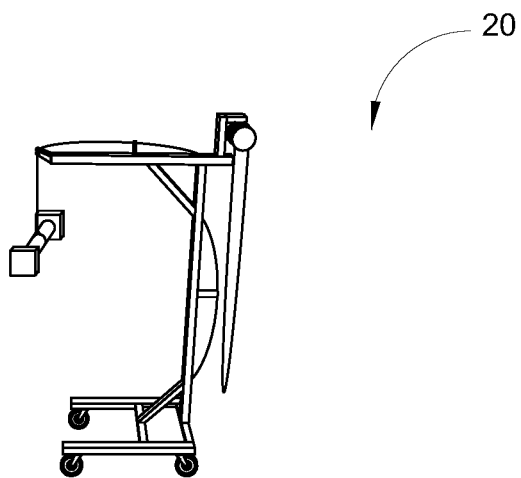
FIG. 1b illustrates a prior art block hoist.
Figure 1C:
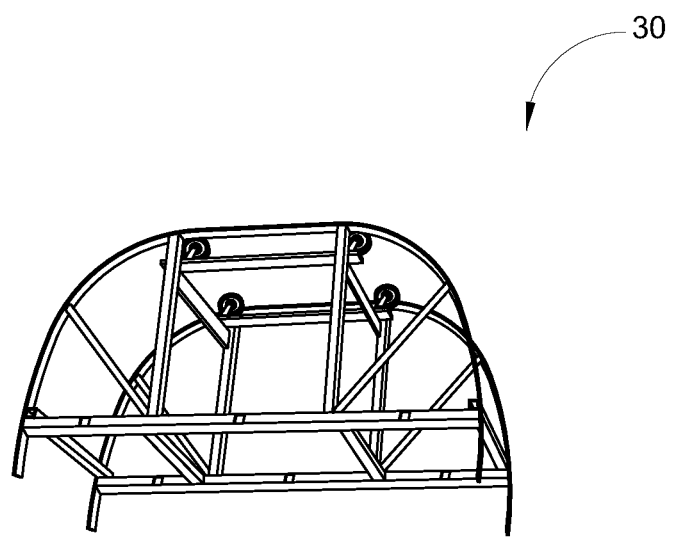
FIG. 1c illustrates a prior art block tilt cart.
Figure 2:
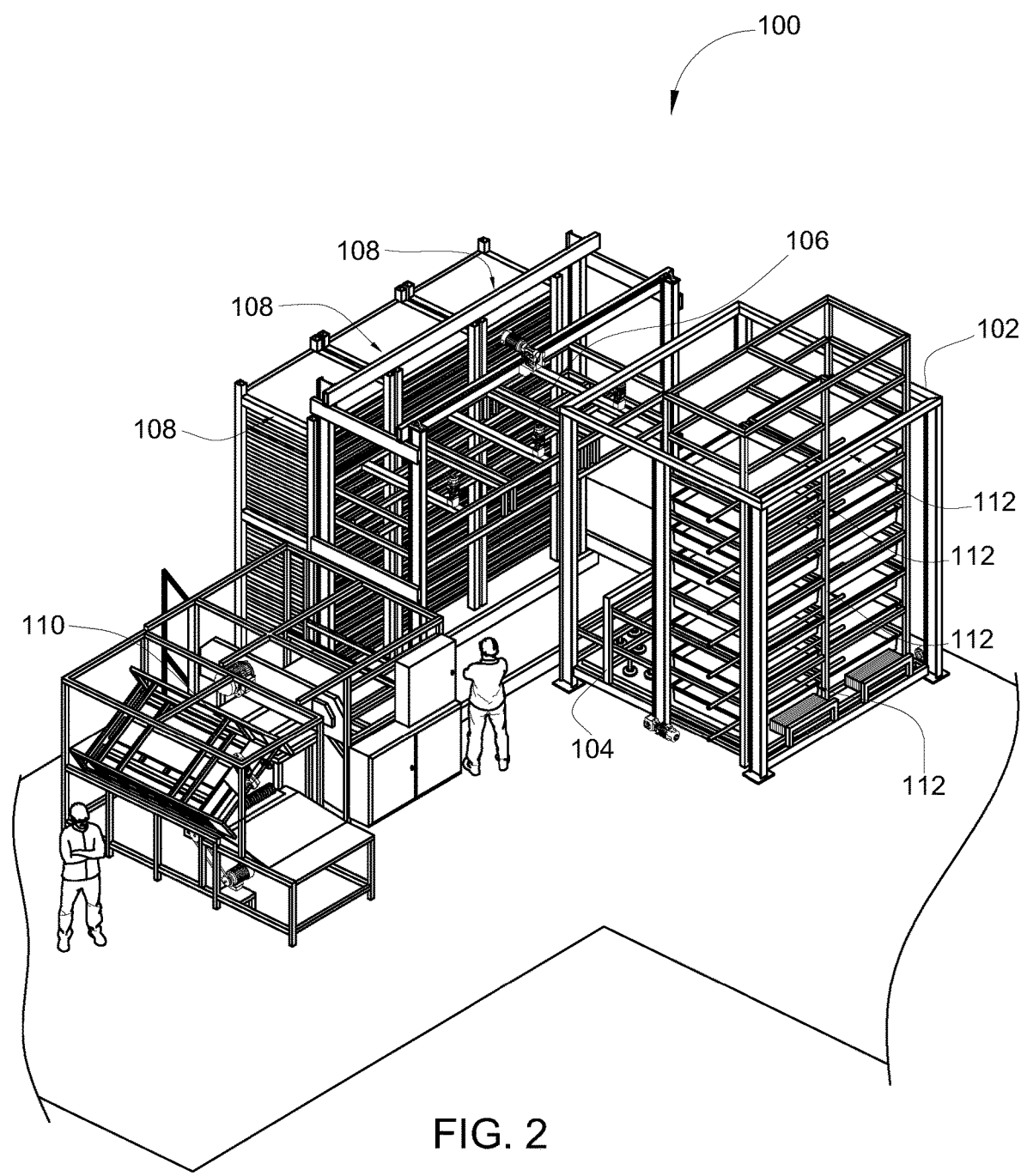
FIG. 2 illustrates a system for ice manufacture, in accordance with one embodiment.

FIG. 2 illustrates a system 100 for ice manufacture, in accordance with one embodiment. As shown, the system 100 includes a freezing module 102, a demolding module 104, a material handling gantry 106, a storage module 108, and a converting module 110. The freezing module 102 includes a plurality of plate freezers or freeze plates 112. The converting module in FIG. 2 is shown as a single module but may alternatively comprise a plurality of substations. A system controller and a plurality of module controllers may be provided. The module controllers run each module and the system controller communicates with each of the module controllers. Each of the system and module controllers may be a programmed logic controllers (PLCs) or other suitable device. Each of the modules is described more fully below. The system may be fully automated, fully manual, or partially automated. Each of the modules may be automated or may be manual. All or part of the system may be positioned in a cold room such that ice in the system does not melt during processing. Some portions of the system may be provided in different environments than other portions of the system. For example, the freezing module may be in a cooler while the storage and converting module may be in walk-in coolers.

Figure 3:
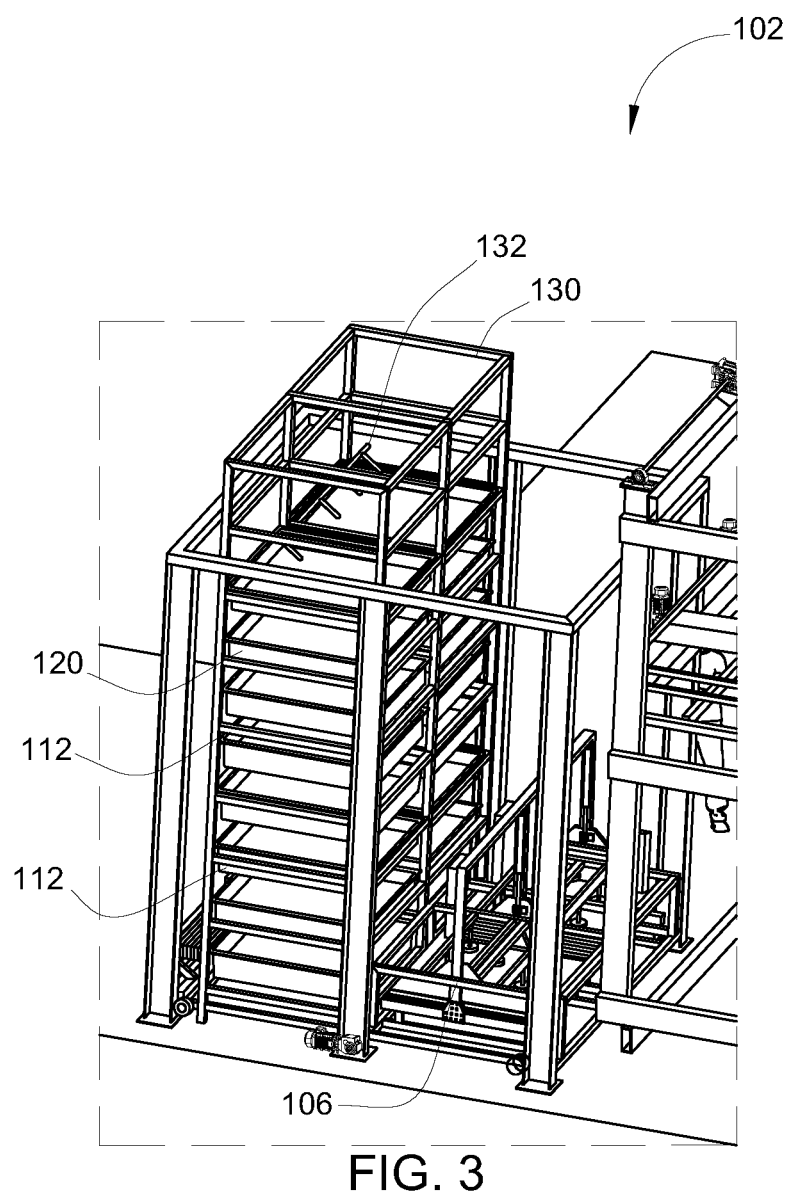
FIG. 3 illustrates a freezing module and demolding module, in accordance with one embodiment.

FIG. 3 illustrates a freezing module 102 (also referred to as an ice module) and demolding module 104, in accordance with one embodiment. The freezing module 102 may be used with any suitable water. In some embodiments, the freezing module 102 is used with purified water, soft water, water having not more than 0.01% of salt content, or other suitable water. The freezing module 102 freezes water into clear sheets or slabs of ice using molds 120. The molds 120 are positioned on plate freezers 112 for such freezing. The plate freezers 112 may also be referred to as freeze plates. In general, the formed clear sheets have minimal variation in thickness. The freezing module 102 may be placed in a controlled environment such as a walk-in cooler that controls the environment around the freezing module to ensure equal and constant freezing of ice.

Figure 4A:
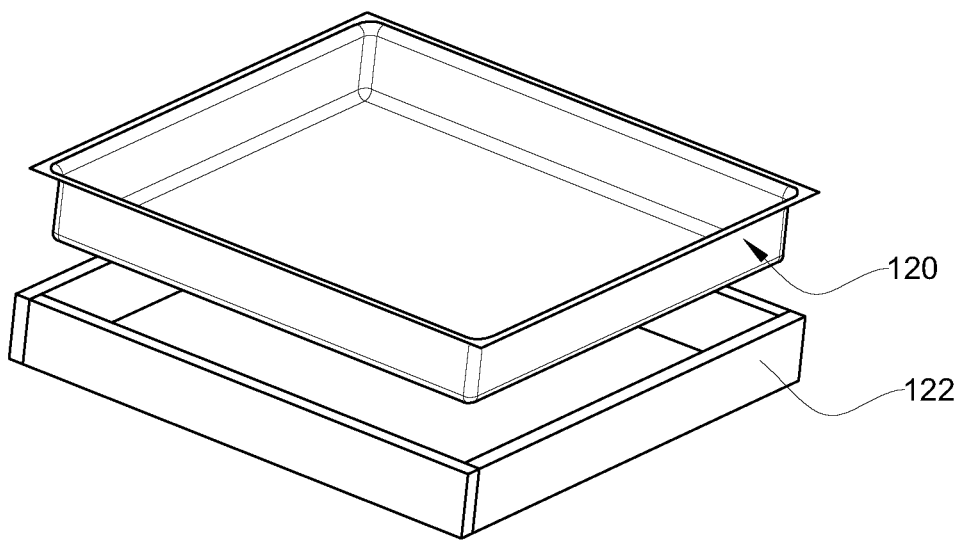
FIG. 4a illustrates a mold and a freeze frame for use with the freezing module, in accordance with one embodiment.

FIG. 4a illustrates a mold 120 and a freeze frame 122 for use with the freezing module. In one embodiment, the mold 120 is a silicon mold having sides and bottom. The freeze frame 122 can be used to provide structural integrity to the mold as it is filled with water. The bottom of the freeze frame 122 is open. The molds and the freeze frames and may have any suitable shape and size. In general, it may be useful for the mold to have a depth of no more than 6 inches. For example, the mold 120 may have a depth of between 1.5 and 7 inches. The mold 120 may be made out of silicon, metal, plastic, or other suitable materials. The freeze frame 122 may be stainless steel, aluminum, plastic or other suitable material.

Figure 4B:
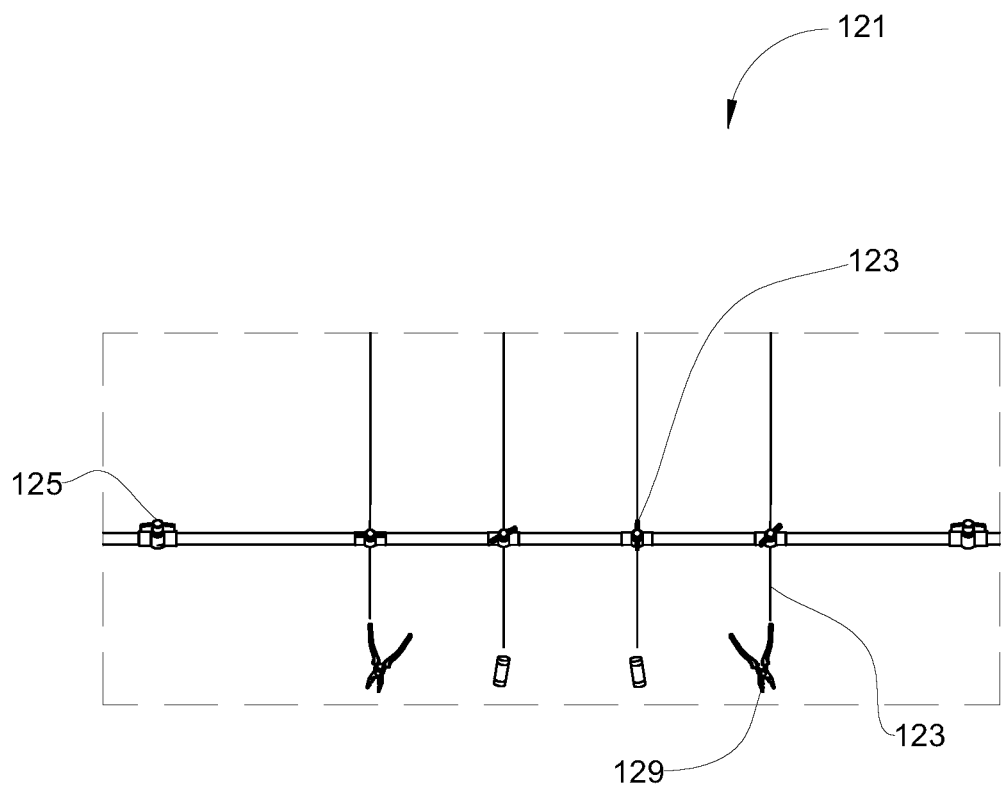
FIG. 4b illustrates a freeze in fixture, in accordance with one embodiment.

FIG. 4b illustrates a freeze in fixture 121, in accordance with one embodiment. The freeze in fixture 121 may be used to clip items in a position such that they freeze in the ice for display. The freeze in fixture 121 includes a downrigger 125, pivot adjusters and rods 123, and clips 129. The clips can, for example, fit luge tubes.

Returning now to FIG. 3, the freezing module 102 includes a frame 130 comprising a plurality of levels, each level having a plate freezer 112 or similar freezing mechanism and a control frame 132. The plate freezer 112 may be any suitable size for receiving a mold 120 to freeze water in the mold 120. In one embodiment, the plate freezer is 50" wide×90" long. A submersible fill pump is provided in fluid communication with an inlet source to fill the mold with water. Any suitable number of fill pumps may be provided with the freezing module. For example, a fill pump may be provided on each control frame 132. Alternatively, a single fill pump may be provided and maybe movable between the levels. A flowmeter may be used to monitor water fill level in the mold and may be any suitable type of flowmeter or water meter. In alternative embodiments, fill may done based on time and a timer may be used in lieu of a flowmeter. In some embodiments, a drain may be provided on or near the freeze plate.

A control frame 132 is positioned above each plate. Each control frame 132 may be associated with a single mold 120 or may be shared among a plurality of molds on a plate freezer. In the embodiment of FIG. 3, one control frame 132 is shared by two molds 120 on one plate freezer 112. In one embedment, the control frame 132 supports one ore more (for example, one to six) circulation pumps, ice depth sensors, flow meters, and vacuum pumps that can be moved as the ice freezes.

The control frame 132, sometimes referred to as a circulation frame, is configured to move relative the freezing module 102, positions the circulation pumps, and turn aspects of the control unit on and off. The control frame 132 thus may be movable from an elevated position to a fill position. In in the fill position, the control frame 132 is at least partially within the mold 120 and can turn on the fill pump. The fill pump directs water into the mold 120 until a desired water level is attained. The desired water level, or depth, is determined by the desired thickness of the final ice product. The water depth or level may range from, for example, approximately 1.5 inches to approximately 5 inches. In one embodiment, water flows from an inlet source through a water flowmeter to determine when the desired level is attained. The flowmeter measures the water via a piston, paddle wheel, turbine, ultra-sonic, magnetic, time clock, liquid level float sensor, or similar device.

Figure 5A:
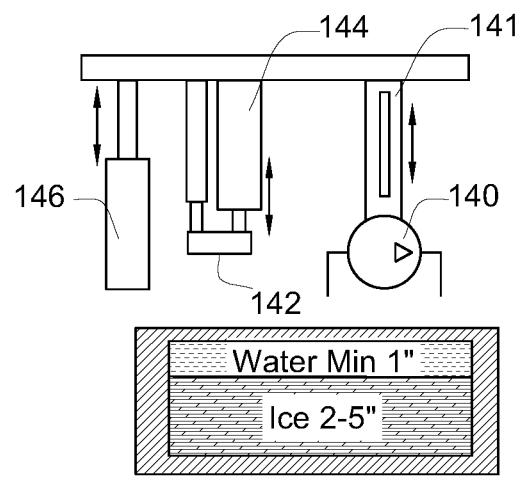
FIG. 5a illustrates one aspect of a control frame, in accordance with one embodiment.
Figure 5B:
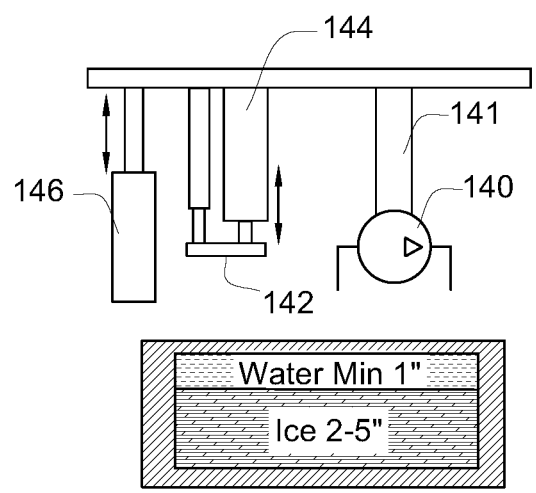
FIG. 5b illustrates another aspect of a control frame, in accordance with one embodiment.

FIGS. 5a and 5b illustrate exemplary configurations of one aspect of a control frame. As shown, the control frame may include a circulation pump 140, a circulation pump actuator 141, a sensor 142, a sensing actuator 144, and a frame actuator 146. The sensor 142 is coupled to the sensing actuator 144 for movement in the mold. The sensor may be configured to sense 1.75" to 5.75" ice depths. The sensing actuator 144 may have a 5" stroke. The circulation pump 140 is coupled to the circulation pump actuator 141 for movement in the mold. The circulation pump 140 may have a height adjustment of between 3" and 6", for example. In the embodiment of FIG. 5a, the circulation pump may be manually adjusted to accommodate different heights of ice layer. The frame actuator may have a 3" or a 5" stroke. In the embodiment of FIG. 5b, the frame actuator has three positions –0, 3", and 5". These may be achieved pneumatically. In general, the frame actuator may be adjustable to at least around 4" to accommodate 2" and 5" thick sheets of ice.

The circulation pumps 140 circulate the water to release air bubbles as the water freezes. After the mold has been filled with water to the desired level, the plate freezer, or cooling unit, and circulation pumps are turned on. The pumps may be controlled automatically, semi-automatically, or manually. As the plate freezer begins to drop below freezing, the circulation pumps 140 rotate the water in the mold so that the water freezes into clear ice with substantially no imperfections. The pumps may be 20 to 200 gallons per minute pumps. In some embodiments, the pumps may be variable frequency drive pumps such that voltage, frequency, AC, motor speed, and torque may be varied. The plate freezer may be left on during the extraction of the ice once completed. It may be turned off automatically, semi-automatically, or manually.

The circulation pumps 140 may operate at between approximately 20 gallons/hour and approximately 200 gallons/hour. Less than 20 gallons/hour is may lead to bubbles being present in the ice. Over 200 gallons/hour agitates the water to an extent that it takes longer to freeze. In one embodiment, the circulation pumps drive at approximately 160 gallons/hour. The control frame sensors 142 take readings of the ice as it is formed and these readings can be used to alter function of the circulation pumps, for example. For example, the flow rate of the circulation pumps may generally be reduced as the ice level goes up to reduce the likelihood of imperfections such as waviness.

The location of the circulation pumps 140 in the water may be adjusted during freezing. Thus, for example, the circulation pumps may be located near the bottom of the mold when freezing starts so as to agitate the water being frozen. The pumps 140 may be gradually lifted using the control pump actuators 141 during the freezing process so as to not be frozen into the ice. Further, the control frame itself may be lifted during freezing from the fill position to the elevated position. This allows ice to form, as too not have too much water flow over the ice which can slow the process down. Lifting or the circulation pumps and/or the control frame can be done with coordination between the applicable unit and the sensors sensing height of the ice. The data of the sensors may be collected in a database at the system controller. Such sensor may be a depth sensor, limit switch, or sensor of a type which can measure depth of ice. Ice does not freeze perfectly flat and, in some embodiments, the sensors may be used to collect multiple datapoints such as height, time, and date. These datapoints may be used to adjust the freezing process. This all could be done manually, semi-automatically, or automatically.

The control frame may be provided with a mechanism for moving the control frame between the elevated position and the fill position. Such mechanism may be, for example, a multi position ball and composite bearing thruster, a sliding bearing guided cylinder, a multi-pneumatic cylinder, or similar device. The position of the control frame, and thus of components of the control frame in the mold, may be adjusted as the ice freezes such as based on readings of the freezers regarding ice height. In the embodiment of FIG. 5a, the circulation pump may be manually adjusted, semi-automatically or automatically adjusted to accommodate different heights of ice.

Figure 6A:
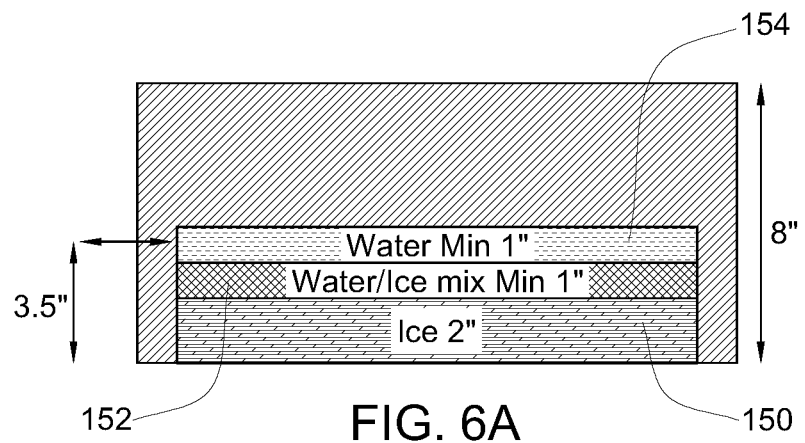
FIG. 6a illustrates an ice cross section, in accordance with one embodiment.
Figure 6B:
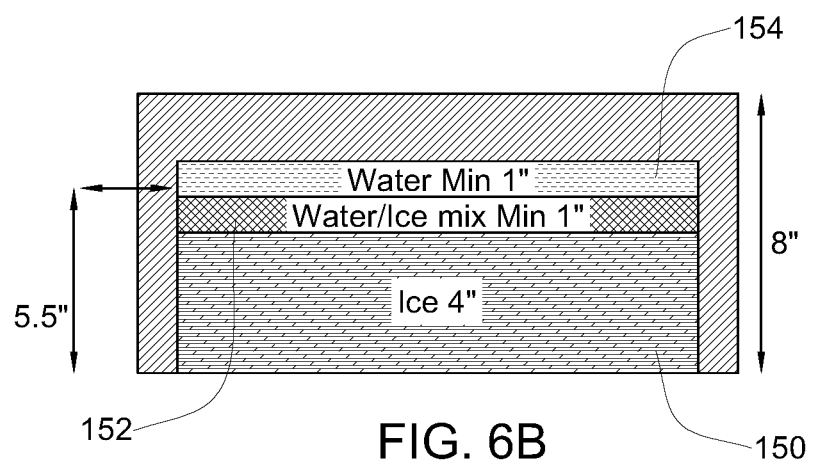
FIG. 6b illustrates an ice cross section, in accordance with another embodiment.

FIGS. 6a and 6b illustrate example ice cross sections. When ice is formed, a plurality of layers can exist. These include an ice layer 150, a water/ice mixture layer 152, and a water layer 154. In FIG. 6a, the ice layer is 2" thick, the water/ice mix is a minimum of 1" thick, and the water layer is a minimum of 1" thick. In FIG. 6b, the ice layer is 4" thick, the water/ice mix is a minimum of 1" thick, and the water layer is a minimum of 1" thick. The water/ice layer is a buffer that is provided to account for freeze topography. The water layer is a buffer to ensure submerged components from the control frame will not freeze into the ice layer and to ensure that the pumps are circulating water and not water, ice mix. The water removal mechanism of the control frame is used to remove the water layer and the water/ice layer from the mold. In some embodiments, the water removal mechanism thus may be a vacuum, In some embodiments, the water removal mechanism is integral to the fill pump comprises of reversing the flow of the fill pump or other suitable devices to remove the excess water from the mold.

In one embodiment, operation of the control frame thus includes lowering the control frame to the fill position—or generally lowering the control frame into the mold. This may be at, for example, a 5" or a 2" height depending on the desired ice height. The fill valve is opened and water is pumped into the mold. The fill valve is closed when a liquid proximity sensor or total volume of water is triggered. The circulation pumps are switched on. After an initial freezing time period, ice thickness is measured and the sensor is triggered. This is repeated until the desired ice thickness is reached. After the ice has reached the desired thickness, the excess water is removed. As previously discussed, any suitable water removal mechanism, such as a vacuum, reversing the fill pump, or a sump pump may be used. The circulation frame is then raised to the elevated position.

The freezing module may be guided and controlled by a freezing module controller such as a programmed logic controller (PLC) or similar device. The freezing module controller may communicate with the system controller. The freezing module controller can be used to control movement of the control frame between the elevated position and the fill position. When the control frame is in the fill position, the freezing module controller may direct the control frame to turn on the submersible fill pump. Once the appropriate amount of water, for example as programmed by the freezing module controller, has been discharged into the mold, the fill pump may be commanded to be turned off. It is to be appreciated that while a freezing module controller is specifically described, the functions of the controller may alternatively be performed manually. Sensors sense the ice at set program times or continuously. Based on sensed ice, the freezing module controller can direct the control frame to move upwardly, to remove excess water, etc. The control frame may be raised to the elevated position after the excess water has been moved so the ice molds can clear the control frame.

After the ice is formed, the overlying water removed, the ice is removed from the freezing module. This can be done using the demold module and/or the freeze module.

FIG. 7a illustrates a demold module 104. The demold module 104 includes a lift 160, demold frame 162, a shelf 164, a push/pull mechanism 166, and a demold mechanism (see FIGS. 8a and 8b). The demold frame 162 can be moved along the freezing unit 102. The lift 160 moves the shelf 164 and the push/pull mechanism 166 to generally align with the plate freezer for the mold being removed. The push/pull mechanism 166 includes side extensions 168 and a distal engagement piece 170. The side extensions 168 are movable along a track 169. To remove the mold from the plate freezer, the side extensions 168 are moved in the track 169 to push the distal engagement piece 170 over the mold. The distal engagement piece 170 is then lowered to engage a distal side surface of the mold. The side extensions 168 are then reversed in the track 169, with the distal engagement piece 170 pulling the mold onto the shelf 164. The mold is thus removed from the freezing module. It is to be appreciated that instead of pulling the mold onto the demold module, the mold could be pushed onto the demold module. The demold module and the push/pull mechanism may be driven by a chain, stepper motors, hydraulics, traction driven system, vertical reciprocating conveyor, scissor lift, or similar system.

Figure 7B:
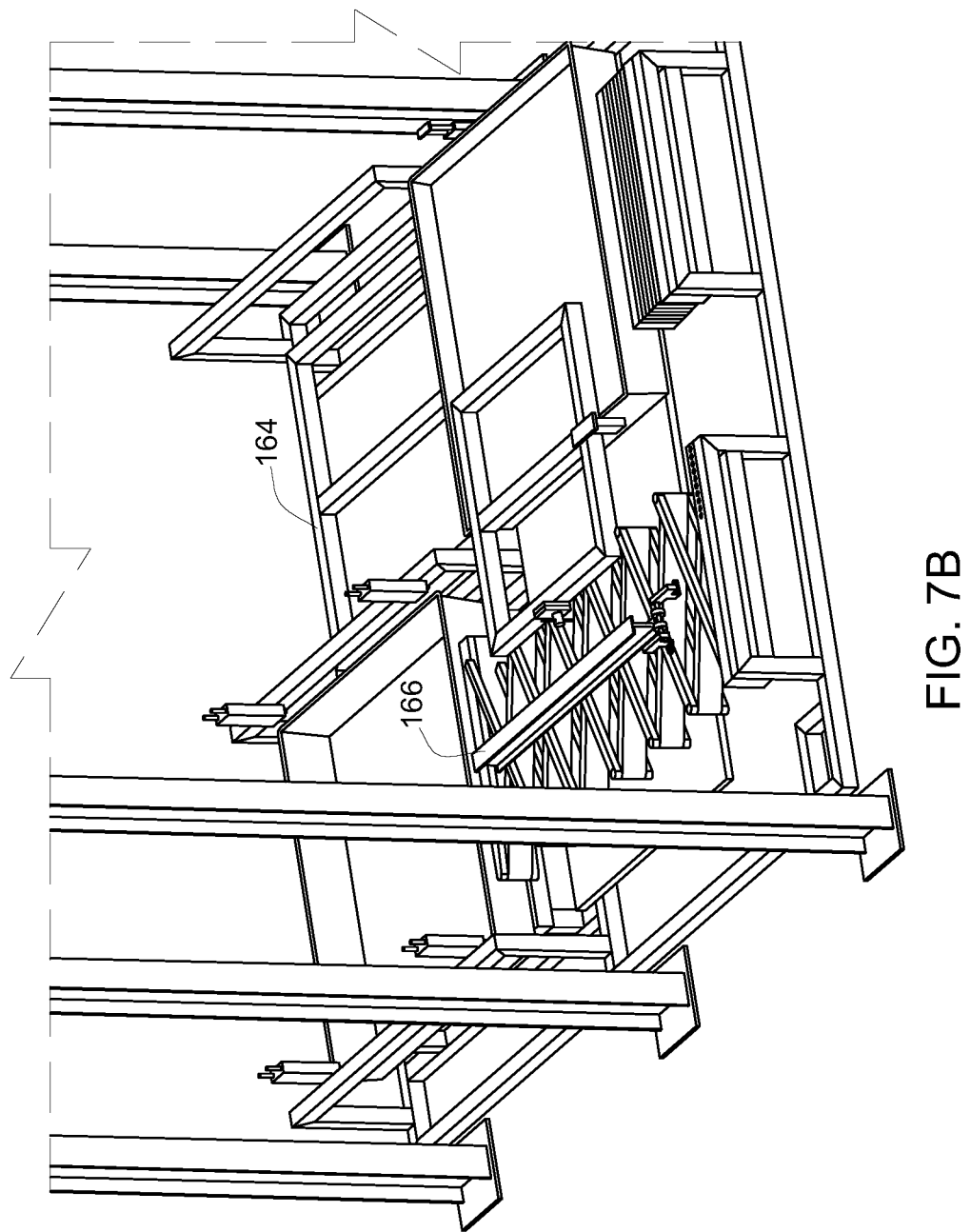
FIG. 7b illustrates a demold module, in accordance with another embodiment.

FIG. 7b illustrate an alternative embodiment of a push/pull mechanism 166 designed for pushing the mold from the freezing module onto the shelf 164. In such embodiment, the push/pull mechanism may be provided as part of the freezing module. In some embodiments, the freeze plate could be a shelf that slides out to be under the demold module.

Figure 8A:
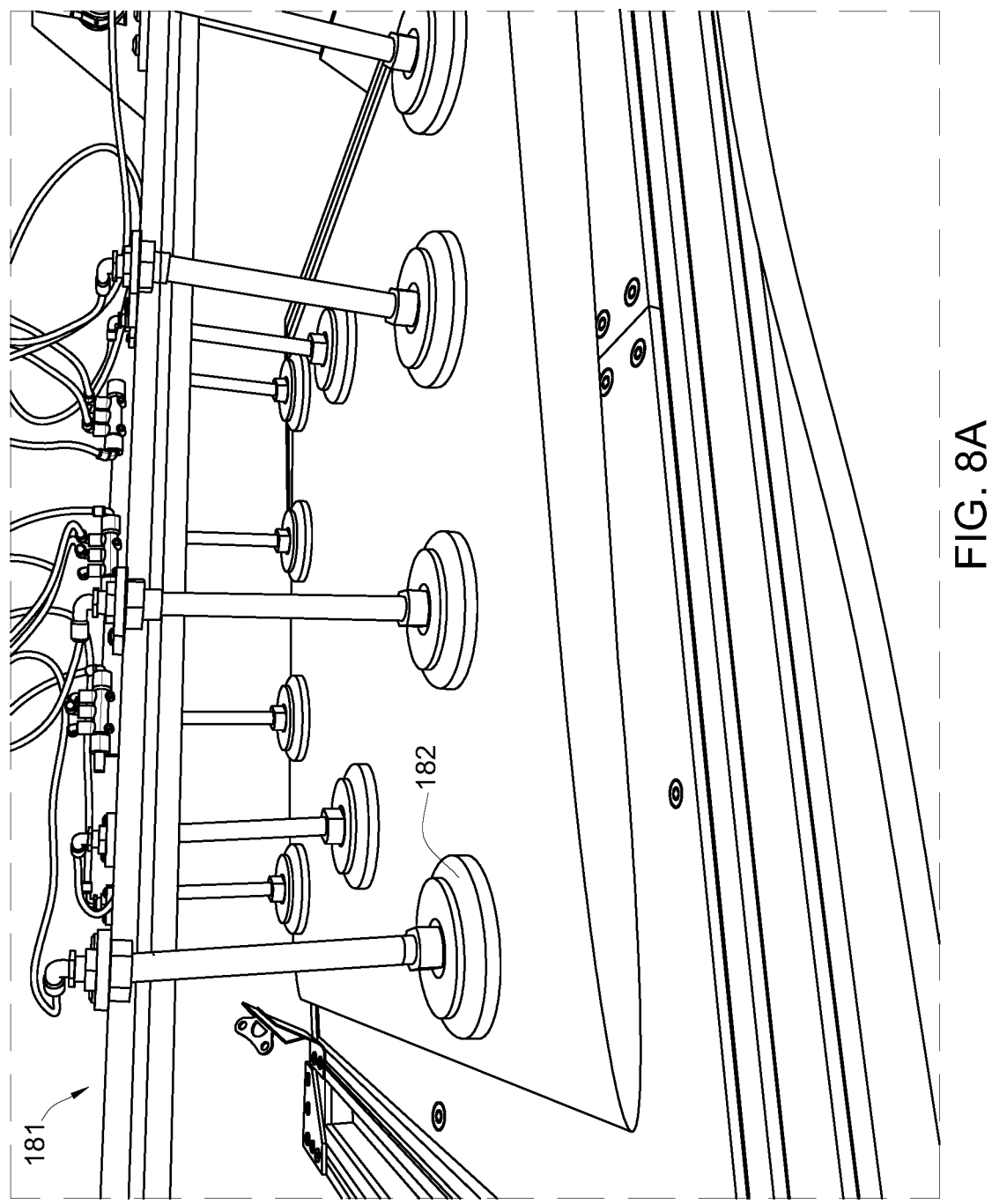
FIG. 8a illustrates a first view of a demold mechanism for removing the ice from the mold, in accordance with one embodiment.
Figure 8B:
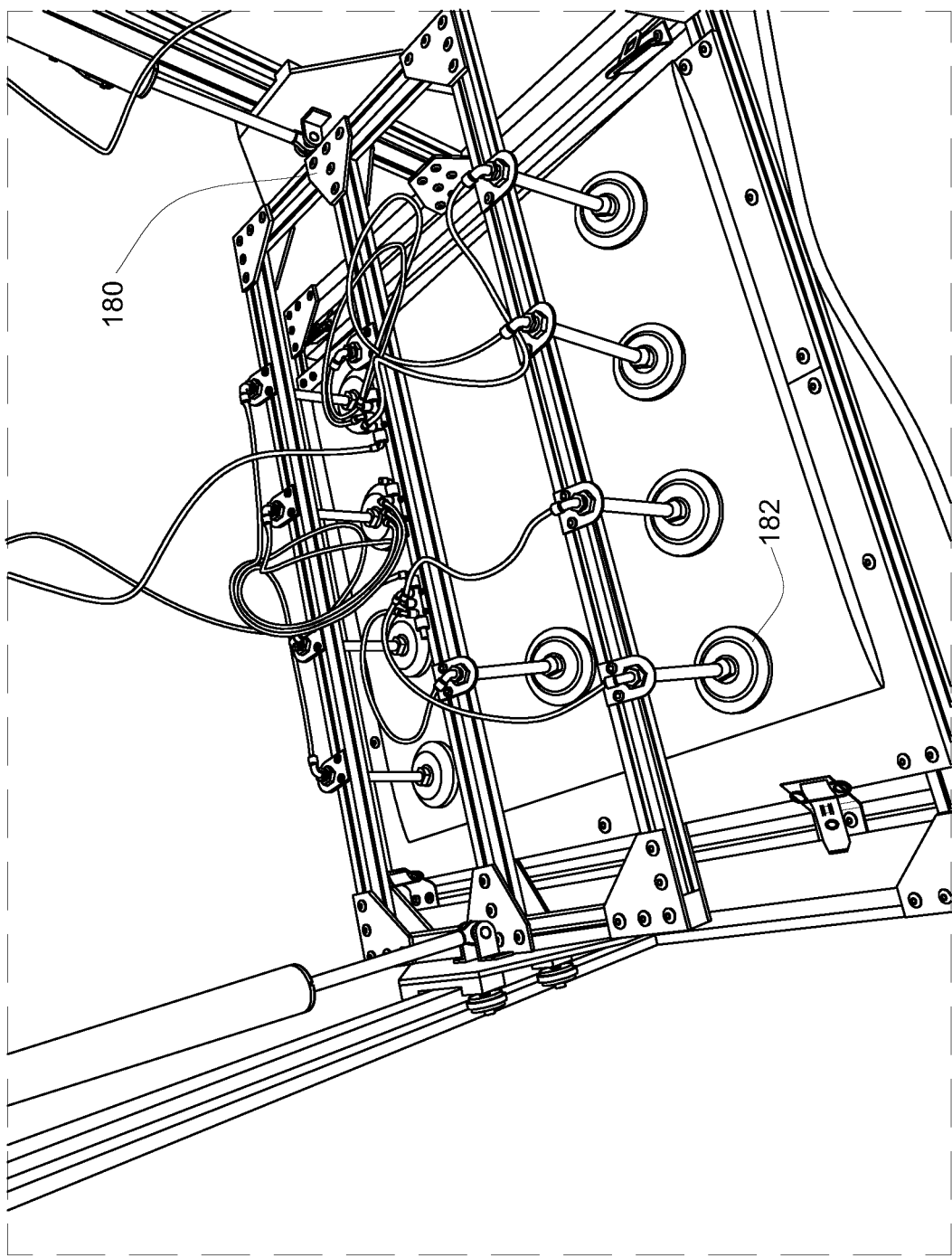
FIG. 8b illustrates a second view of a demold mechanism for removing the ice from the mold, in accordance with one embodiment.

FIGS. 8a and 8b illustrate a demold mechanism 180 for removing the ice from the mold. In the embodiment shown, the demold mechanism 180 comprises a plurality of grippers 182 for engaging the ice. In one embodiment, the grippers 182 comprise suction cups. The grippers 182 engage the ice and lift the ice from the mold. The grippers 182 then can secure the ice to the shelf. It is to be appreciated that the shelf may be moved to a set position to receive the ice from the grips, such as under command of the controller. Such movement may be done by utilizing stepper motors, hydraulics, etc. Once the ice is received by the shelf, the shelf may be moved to a height that clears the mold. The mold then may be returned to the freezing module, where it can be filled with water and another cycle of freezing initiated. The ice held by the demold mechanism then may be moved to the next processing module.

Accordingly, using the freezing module, ice is formed in a mold. The demold module then may be used to remove the mold from the freezing module and remove the ice from the mold. If the ice is intended for further processing, the ice may then be routed for further processing or storage. In some embodiments, the mold may be disposable and used as part or all of the ice product's final packaging (and thus demolding and processing may be skipped).

Figure 9:
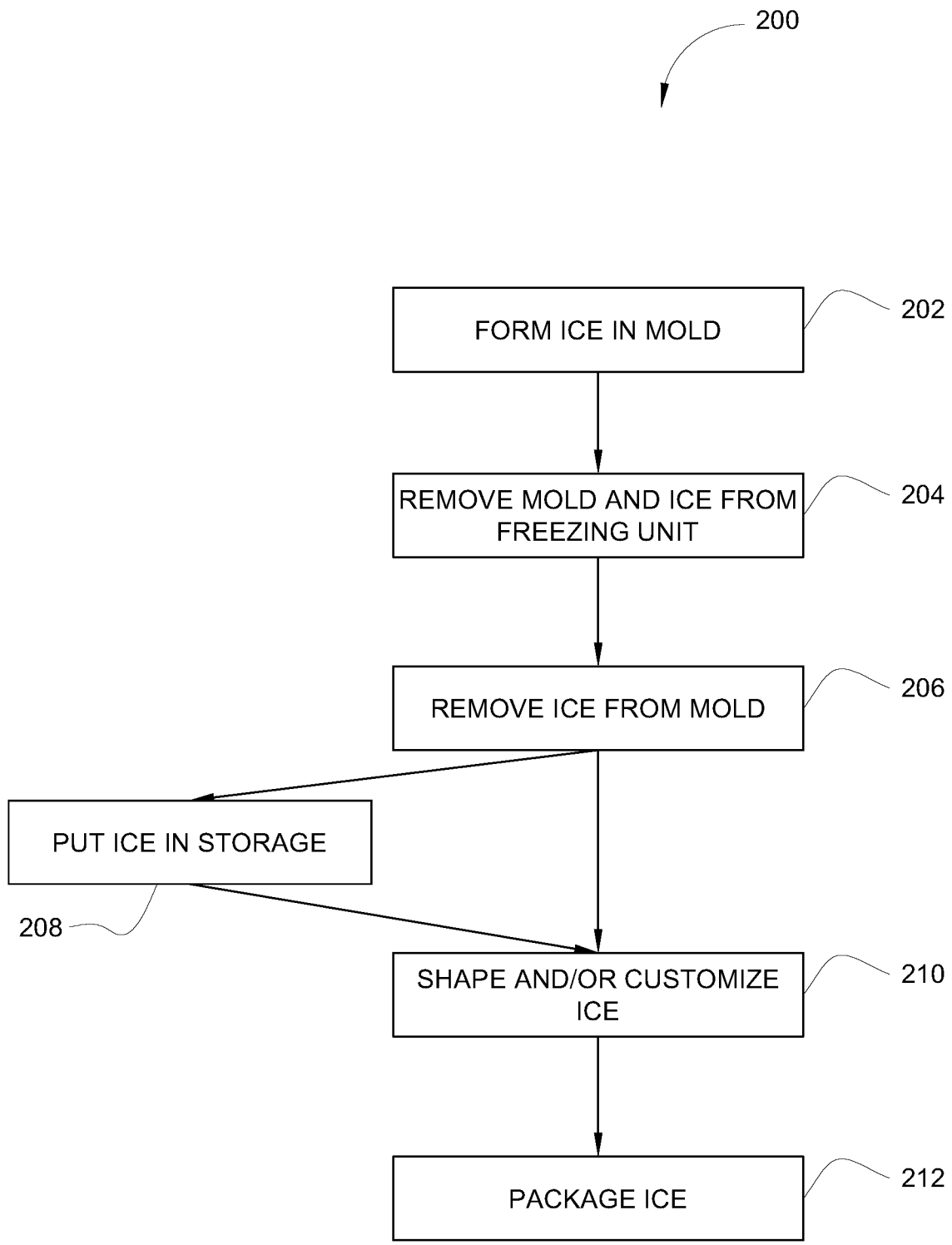
FIG. 9 illustrates a method for manufacturing ice, in accordance with one embodiment.

FIG. 9 illustrates a method 200 for manufacturing ice, in accordance with one embodiment. The method includes an initial step of forming ice 202. Such formation may be done using a freezing module such as that discussed above. Accordingly, ice, such as ice sheets, are formed in a mold. During formation, the ice may be customized using freeze-ins. The mold, with formed ice therein, is removed from the freezing module 204 after the ice is formed. The ice sheets are demolded 206 before further processing or packaging. It is to be appreciated that, in some embodiments, the ice may not be immediately removed from the mold and may be stored in the mold. The ice sheets may be immediately processed or may be stored. If stored 208, the ice sheets are routed to a storage area such as a holding storage freezer. The ice is shaped and/or customized 210. Shaping may comprise converting the ice sheets into predetermined sized cubes, spheres, sculptures, or other shape. Customizing the ice may comprise stamping or engraving the ice with words or symbols. After shaping, the ice is packaged 212. Each of the steps in the method, and transport of the ice between each step in the method, may be done automatically, semi-automatically, or manually.

In some embodiments, after removing the mold and ice from the freezing module, the ice may be indexed for automated processing. This may be done in a material handling gantry between the freezing module and storage or further processing.

Figure 10:
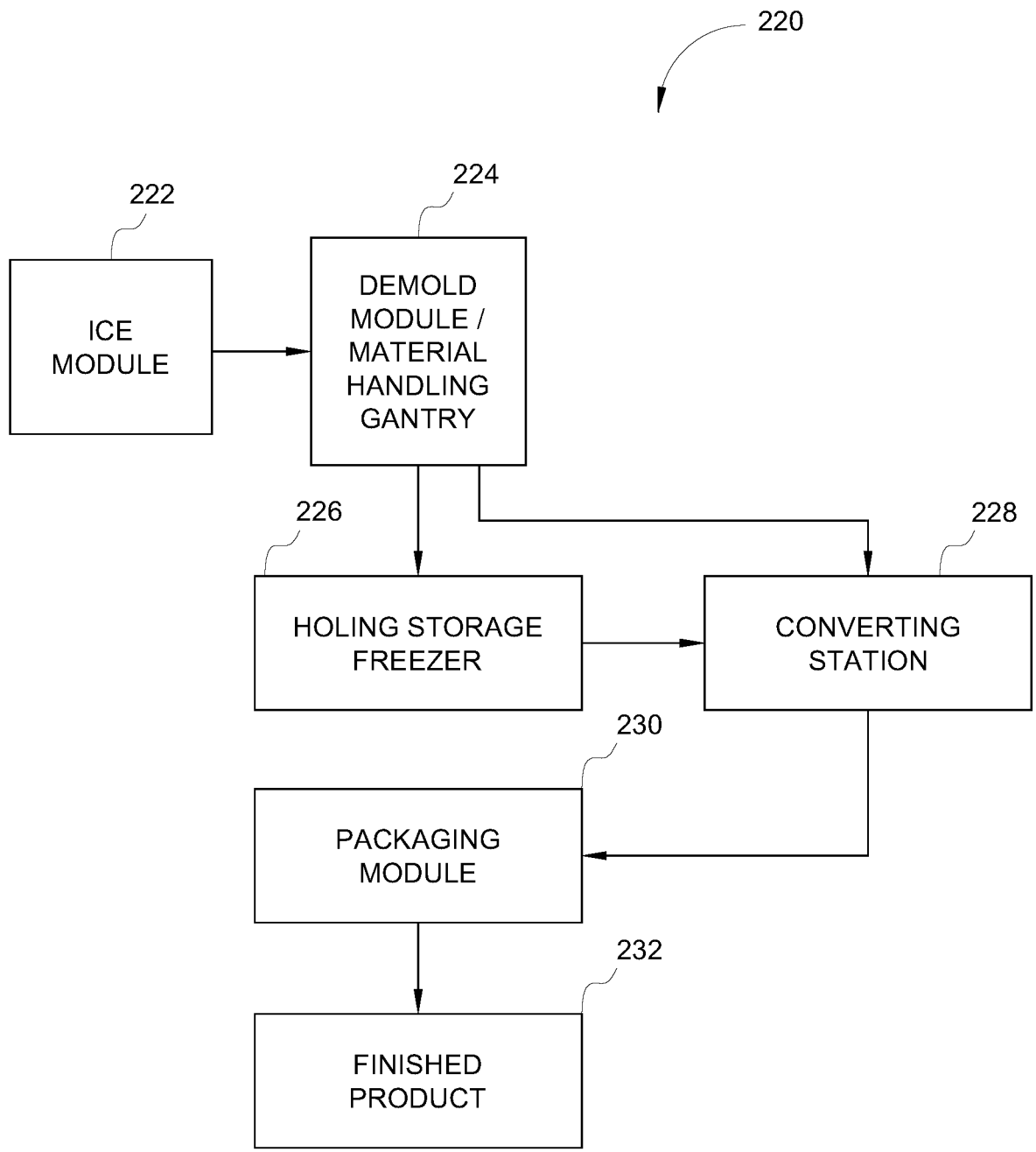
FIG. 10 illustrates a system flow diagram, in accordance with one embodiment.
Figure 11:
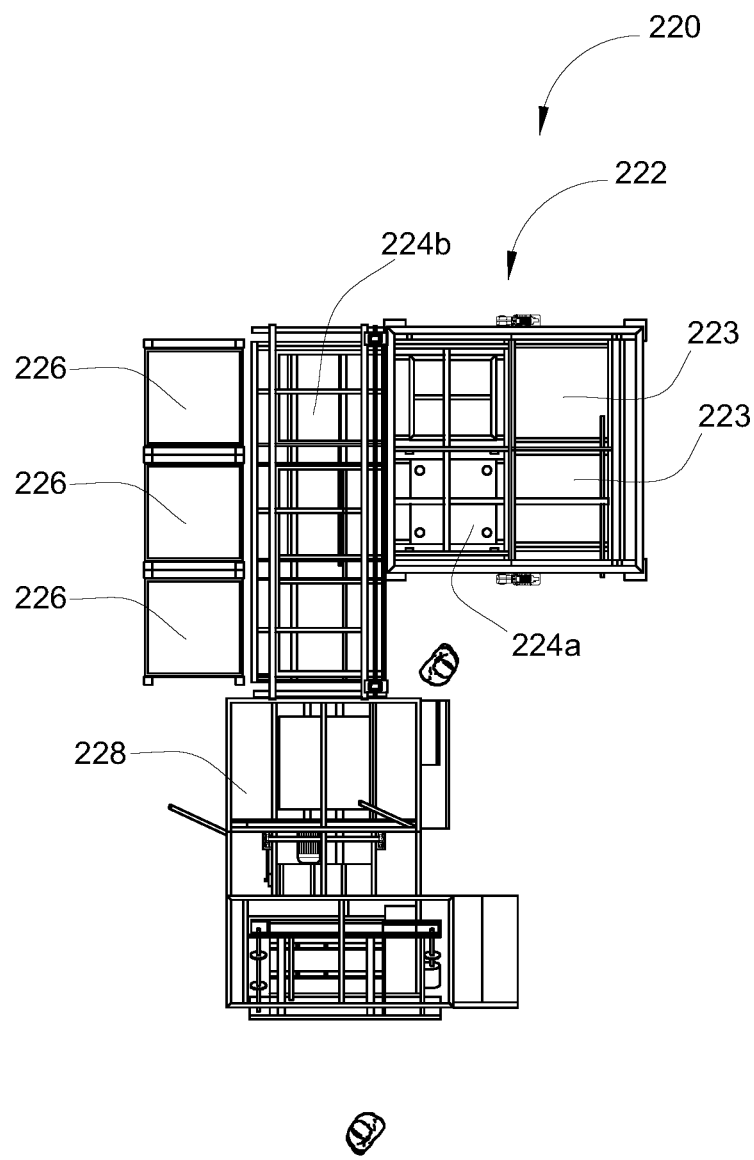
FIG. 11 illustrates a system layout, in accordance with one embodiment.

FIG. 10 illustrates a system flow diagram, in accordance with one embodiment. As shown, the system 220 may include a freezing module or ice module 222, a demold module 224, a holding storage freezer 226, a converting station 228, and a packaging module 230, resulting in a finished product 232. FIG. 11 illustrates a system layout, in accordance with one embodiment. As shown, the system 220 includes a freezing module 222 including plate freezers 223, a demold module 224a, a material handling gantry 224b, ice slab storage 226, and a converting machine 228.

The freezing module 222 produces ice sheets. The ice sheets are clear and substantially free of visual imperfections and reduced thickness variation. Ice does not freeze entirely flat and there may be some minor variation in height. The ice sheets may be processed, as needed, through one or more of the subsequent modules.

After the ice is formed, it is can be routed a variety of ways—for example, to demolding, to material handling, or to storage. While FIG. 10 depicts initial routing to a demold module/material handling gantry, it is to be appreciated that this or other process points may be skipped.

The demold module/material handling gantry 224 may be combined or separate 224*a* and 224*b*. Further, in some embodiments disposable molds may be used or the molds may be used as some or all of the product's final packaging and demoding may not be done. The demold module 224*a* removes the ice from the mold. Demolding is done before further processing or packaging but may be done before or after storage (if storage is done). The material handling gantry 224*b* indexes these sheets for inventory and processing purposes. Indexing of the sheets may be useful in embodiments where the system runs based on a programmed production schedule.

The demolding module 224*a* removes the ice sheet and mold from the freezing module 222 or ice module and transports it to the next stage, for example the material handling gantry. The removal component may be directed automatically, semi-automatically, or manually.

The holding storage freezer 226 stores ice until it is needed. The longest processing step in making ice is the initial freezing of ice. Thus, when it is anticipated that a large amount of ice will be needed, it can be useful to make and store ice for some period of time before processing is done.

The converting station 228 is a processing station. The ice may be routed to the converting station 228 from the demold module 224*a* or from the holding storage freezer 226, for example. The converting station 228 may comprise a single station or a series of stations. The converting station is used to convert the ice sheet from the formed slab to a desired form factor. For example, the converting station may convert the ice sheet into ice products such as predetermined sized cubes. Such conversions may be directed by a user or operator using manual methods, a computer, tablet-based application main controller input, server, cloud software or similar device. Some operations may be able to run lights out with little or no input from a user.

After conversion, the ice products may be sent to the packaging module 230 and packaged as a finished product 232 for distribution. In some embodiments, the packaging module may comprise a sorting table. Packaging may be done automatically, semi-automatically, or manually.

Each of the modules shown in FIGS. 10 and 11 will now be shown and described in further detail.

The ice module/freezing module is shown and described with respect to FIG. 3. The freezing module is used to form a sheet or shape of clear, dense ice in a mold. In some embodiments, a defrost mechanism, such as a hot gas defrost cycle, may be provided for defrosting the freezing module.

After the ice is formed, the clear, dense ice may be routed to a demold module/material handling gantry 224. While the clear, dense ice formed by the freezing module is generally referred to herein as an ice sheet or slab, it is to be appreciated that the molds may be formed to any shape and the formed ice thus may have any shape and that. The demold module/material handling gantry 224 may be combined or separate 224*a*, 224*b*. The demold module is shown and described with respect to FIG. 7. The demolding module removes the ice sheet and mold from the freezing module or ice module. The demold module further removes the ice sheet from the mold and transports it to the next stage, for example the material handling gantry. In some embodiments, the mold may be disposable or may be used as some or all of the final product packaging and the formed ice thus may not be removed from the mold.

In one embodiment, to remove the ice sheet and mold, the demolding module is adjusted to an appropriate height of the plate freezer, for example under control of a demold controller. The lift adjusts the height of the demolding module and may be operated by chain, stepper motors, hydraulics, drum lift system, traction driven system, vertical reciprocating conveyor, scissor lift, or similar system. Once the demold module has reached the appropriate level of plate freezer, the mold is removed from the ice module. In some embodiments, the plate freezer shelf can slide out for the demold module to remove the mold from the plate freezer. If the mold is used as part of or all of the final packaging the demold module may transfer the mold with the ice in it to a further module.

Upon receipt of the mold from the ice module, the demold module removes the slab of ice out of the mold. In some embodiments, the ice may be removed from the mold at a later stage. The demold system may include on or more grips for engaging the ice and lifting the ice from the mold. If the ice is removed from the mold, the mold may be returned to the freezing unit, where more ice may be formed. If the ice is not removed from the mold, a new mold may be loaded into the freezing unit manually, semi-automatically, automatically. Once loaded the control system verifies that the mold is loaded in the proper position and the ice manufacturing process is started (fill, circulate, freeze).

Figure 12:
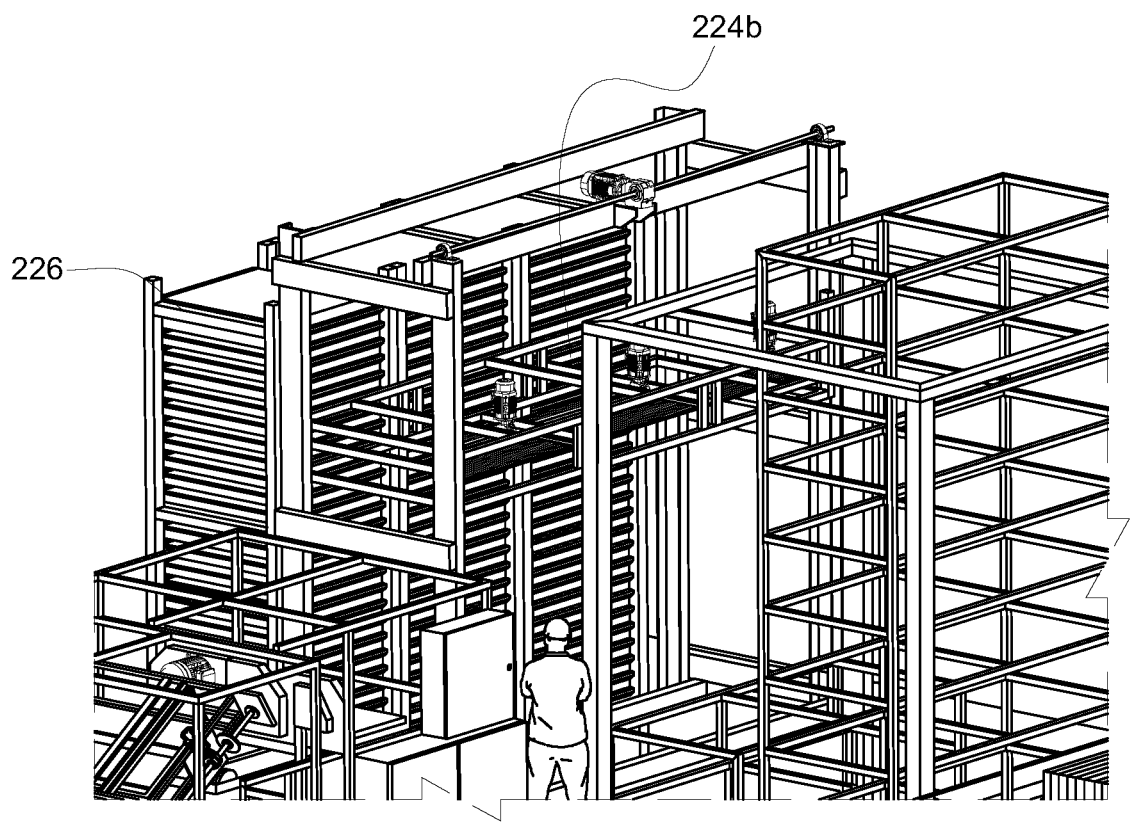
FIG. 12 illustrates a material handling gantry with a material handling gantry robot, in accordance with one embodiment.

FIG. 12 illustrates a material handling gantry 224*b* with a material handling gantry robot. The material handling gantry robot coordinates with several modules of the system. The gantry robot can traverse a full height and width of plate freezers in the freezing module and of storage racks in the storage module, The gantry robot can coordinate with the demold module to transfer ice slabs from the plate freezers to demolding, can assist in transferring the mold back into the plate freezers, can assist in transferring ice sheets to the storage racks 226, and can assist in transferring ice sheets from the storage racks to a further processing station. The material handling gantry indexes the formed ice sheets for inventory and processing purposes. Indexing of the sheets may be useful in embodiments where the system runs based on a programmed production schedule.

The material handling module may be mobile and transfers the ice to its next location. This may be, for example to, a holding storage freezer, a converting station, packaging module, or any of the other provided stations or modules.

The holding storage freezer 226 operates to store the ice for future use. A holding storage freezer is also shown at 108 comprise a series of shelves. Movement of the ice to and from the holding storage freezer may be automated or may be manual. A computer system with a custom user interface may be provided to allow an operator to command the PLC to call for one or more slabs of ice in for further processing.

Figure 13:
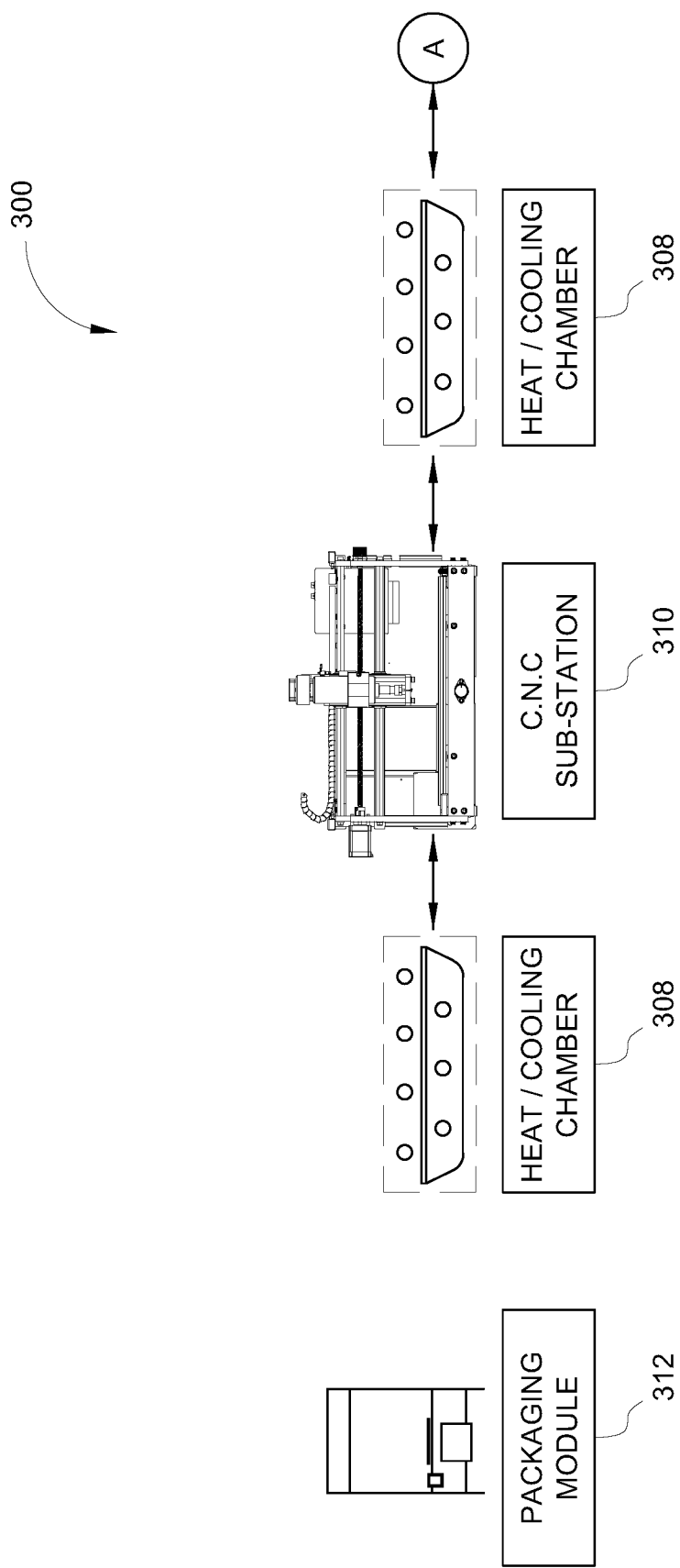
FIG. 13 illustrates a manufacturing line converting station flow diagram, in accordance with one embodiment.
Figure 13:
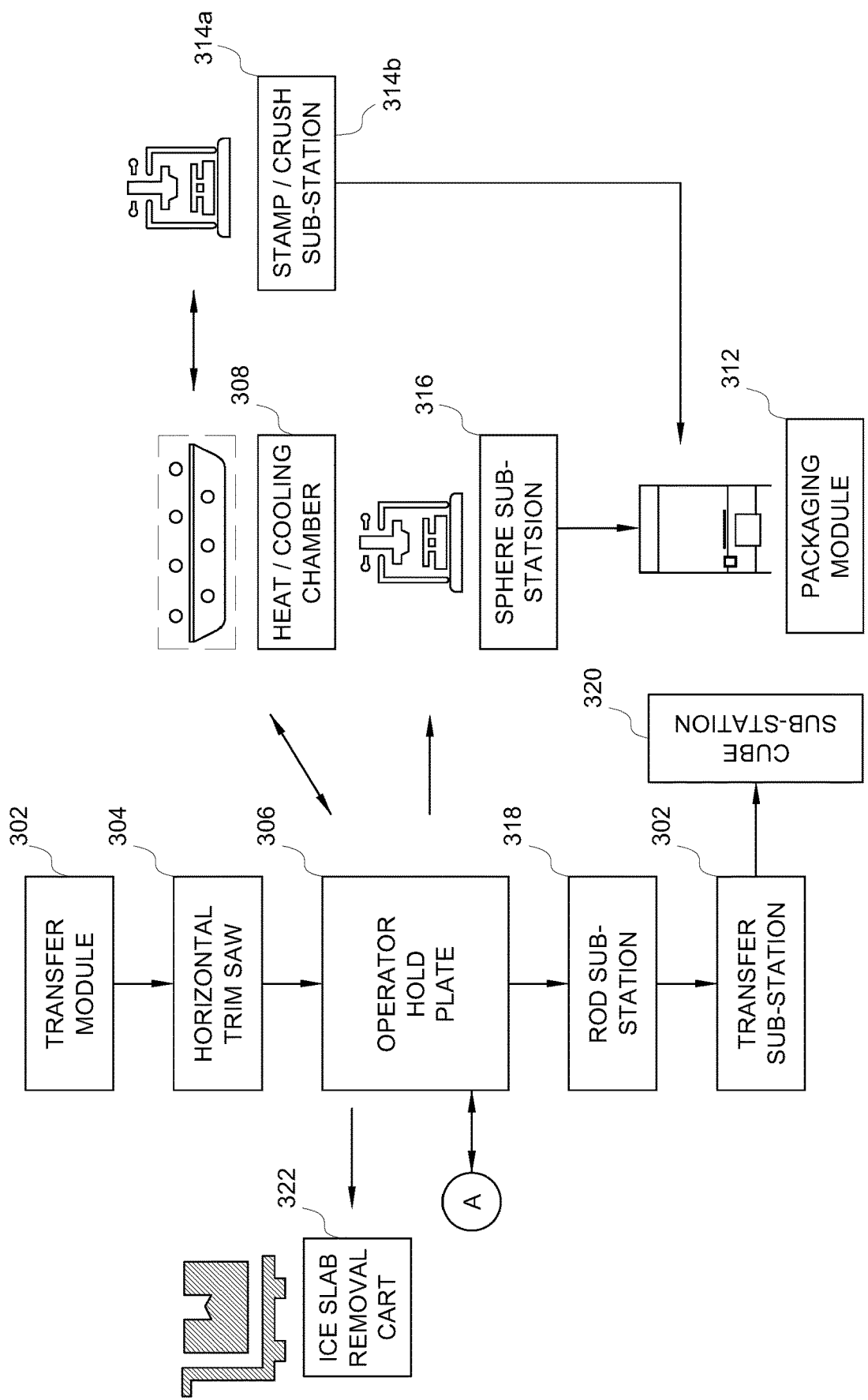

The ice can be further processed in a converting station. This may be directly from demolding or may be after being called from storage. FIG. 13 illustrates a manufacturing line converting station flow diagram. It is to be appreciated that any or all of the stations shown in the diagram may be used and other stations may be provided within the scope of the present invention.

As shown in FIG. 13, the converting station 300 may include a series of process stations for evening out the ice slab, customizing the ice, shaping the ice, cleaning the ice, and/or packaging the shaped ice. More specifically, the converting station 300 may include one or more transfer modules or substations 302, a trim module 304, a hold plate 306, one or more heating and cooling chambers 308, one or more shaping substations 314*a*, 314*b*, 316, 318, 320, a CNC substation 310, and one or more packaging modules 312. An ice slab removal cart may be provided for manual ice transfer. The one or more shaping substations may comprise, for example, a sphere/shape substation 316, a stamp substation 314b, a crush substation 314a, a rod substation 318, or a cube substation 320. Cleaning of the ice generally comprises removing snow and excess ice or water and can be done at any point as well as at specific points. All of these modules may be automated, semi-automated, or manual.

Figure 14:
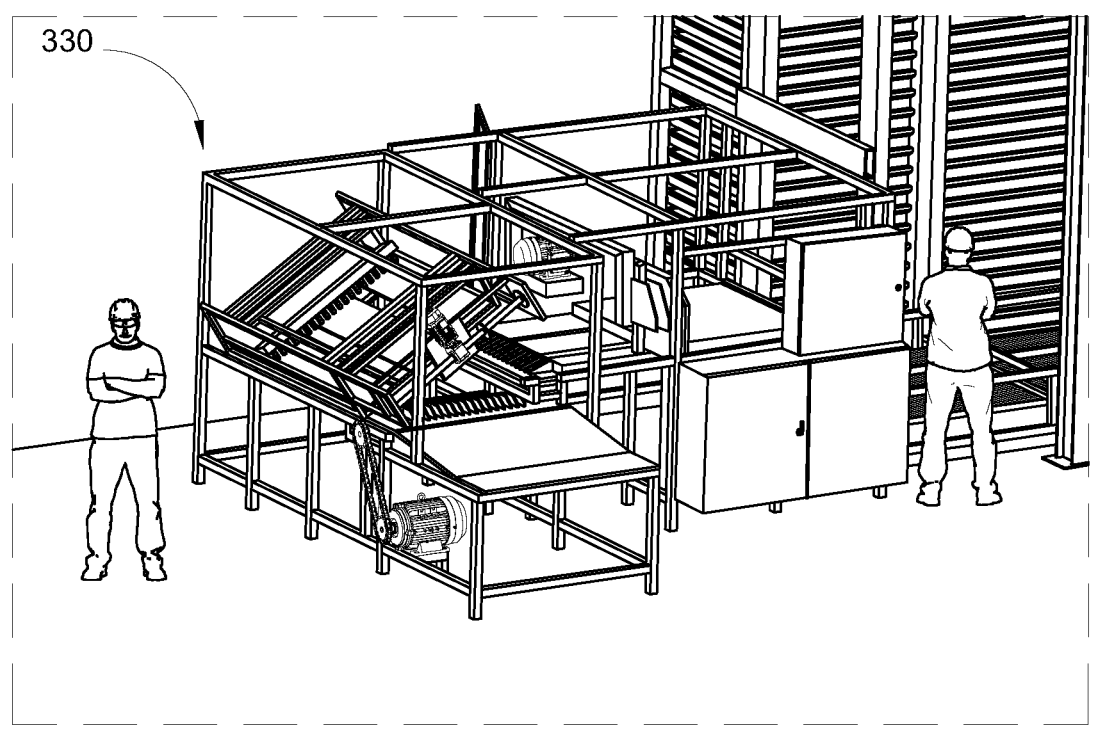
FIG. 14 illustrates a unitary converting machine, in accordance with one embodiment.

FIG. 14 illustrates a unitary converting machine 330 that may be provided in lieu of a converting station, in accordance with one embodiment. The converting machine receives ice slabs from the handling gantry. It trims the top surface of the slab, for example using a band saw. It can then slice the slab into rods using a circular gang saw set. A table of the converting station may be tilted to dump scrap ice into a scrap ice bin. The rods then can be sliced into cubes using a second circular gang saw set. The cubes can then be transferred to a sorting table for manual packaging.

Returning now to FIG. 13, heating and cooling chambers 308 may be provided at multiple points in the converting station. The heating and cooling chambers may be referred to as air chambers. When ice becomes wet, it begins to temper and take on a softer form factor. Heating and cooling may be done to refreeze the ice. When such refreezing is done, the ice will last longer and, in some cases, not conjoin together. In some embodiments, a heating and cooling chamber may utilize heating or cooling methods to process the ice to return it to a state in which may be needed for further processing. In one embodiment, a heating and cooling chamber may include a heated air curtain, such as air heated by a gas torch or heating element followed by a cooling element such as a blast chiller, air curtain, or similar cooling device. The cooling chamber may also be referred to as a drying chamber.

The ice slab may be sent directly to the converting station 300 for processing, without storage in the holding storage freezer. A first step in processing may be to transfer the ice slab to a transfer module. This may comprise using a pusher, puller, conveyor belt or robotic arm to move a slab of ice from the material handling gantry to the transfer module. The pusher, puller, convey belt or robotic arm may be operated by a chain, stepper motors, hydraulics, traction driven system, vertical reciprocating conveyor, scissor lift, or similar type of device. Transfer of the ice may alternatively be done in any suitable manner including manually, using a robotic arm, or other. The transfer module may be configured to clean debris created at one or more substations of the converting station.

From the transfer module 302, the ice may be sent to a trim module 304, also referred to as a saw module. The trim module 304 can be used to reduce the height of the ice slab or to even out the height of the ice slab if the ice slab is not uniform. The saw module 304 thus may remove excess ice from the top of the ice slab. In some embodiments, the saw module may process the ice at the transfer module 302. The saw module 304 may comprise a horizontal trim saw such as a horizontal bandsaw, planner, chainsaw, a hot wire, or similar trimming device. The saw module 304 may be controlled by the controller, semi-automatically or manually. For example, the controller may turn the saw on and off and may set the saw to an appropriate vertical height based on the height of the ice being processed. Once the saw is turned on, the ice is moved through the saw. This may be done using a pusher, puller, convey belt or robotic arm to move the ice from the transfer module and through the saw. As the ice is cut, the scrap material, including snow and scrap ice, can be cleared off using compressed air, a tilt module, and/or a scraper to remove the material.

After the slab has been moved through the horizontal trim saw, the transfer module may be used to clear the scrap ice that has fallen from the ice as the saw module set a clean top edge for the slab. The transfer module may be controlled and directed by the controller and may clear the scrap ice by reversing the chain pushers backwards, which in turn pushes the scrap ice backwards into a hole from which the ice can fall out of the converting station. In an alternative embodiment, the transfer module surface may be lifted up at an angle, such as at an approximately 35-degree angle, to cause the ice to fall off to the side. Alternatively, the ice may be brushed from the support or a guide may be used to knock scrap ice off the support. The transfer module then can be lowered and returned to the horizontal position. Cleaning may be automated, semi-automated, or manual.

From the initial processing step of evening the ice slab, the ice slab may be directed to an operator hold plate 306 or central module from which an operator can direct the ice slab for shaping and/or customization. Alternatively, the ice slab can be removed using an ice slab removal cart 322 and stored or processed outside of the converting station 300 or production line.

Shaping and customization may comprise processing the slab into a plurality of shaped pieces of ice, such as spheres, cubes, rods, or shards, and/or stamping letters, numbers, or a design into the ice. This can be done at one or more substations. Each substations can produce a different ice product. The substations provide separate functions within the manufacturing process. These substations simplify the overall process and provide specialization that allows for different ice products. When provided as separate substations, different ice products can be produced simultaneously. The substations also allow different parts of the process to be scaled to the needs of the user. Thus, a user that produces only one ice product can replicate a substation to the scale needed and not employ other substations.

In general, the ice may be directed to the desired substation by the controller and may be moved to such substation manually or automatically. Automatic movement of the ice may be via a pusher which may be operated by a chain, stepper motors, hydraulics, traction driven system, vertical reciprocating conveyor, scissor lift, or similar type of device. Prior to entering a shaping or customization substation, the ice may go through a heating and cooling chamber 308. The heating and cooling chamber 308 may utilize heating or cooling methods to process the ice to return it to a state in which may be needed for further processing.

Packaging substations or modules 312 may comprise a table with packaging materials or may further comprise elements to facilitate automated packaging. The packaging substation may have a bagger and scale. In some embodiments, the packaging substations may automatically organize the product into the correct sizes and placed the product in the proper packaging for shipment to stores. In general, the packaging substations turn the processed ice into a finished product.

Exemplary shaping and customization substations will now be described.

A crushing substation 314a may be provided to crush the ice to form shards. Shards of ice are randomly formed pieces of ice broken from the ice slab. This substation crushes the ice, breaking it into a plurality of shards or chunks that may be packaged. After crushing, the chunks may be directed to a packaging module. This may be done, for example, by pushing the chunks from the stamping and crushing substation to the packaging module. Ice shards may be packaged as bagged ice suitable for use, for example, in a freezer.

Typical bagged ice can have air bubbles and is not dense. Further, the bagged ice often has a form factor including a central hole known as "Tube Ice". This means that the ice melts from the inside out as well as the outside in. Ice shards formed from clear ice are extremely dense and do not have a central hole. As a result, they typically last 3-4× longer than regular bagged ice.

Figure 15A:
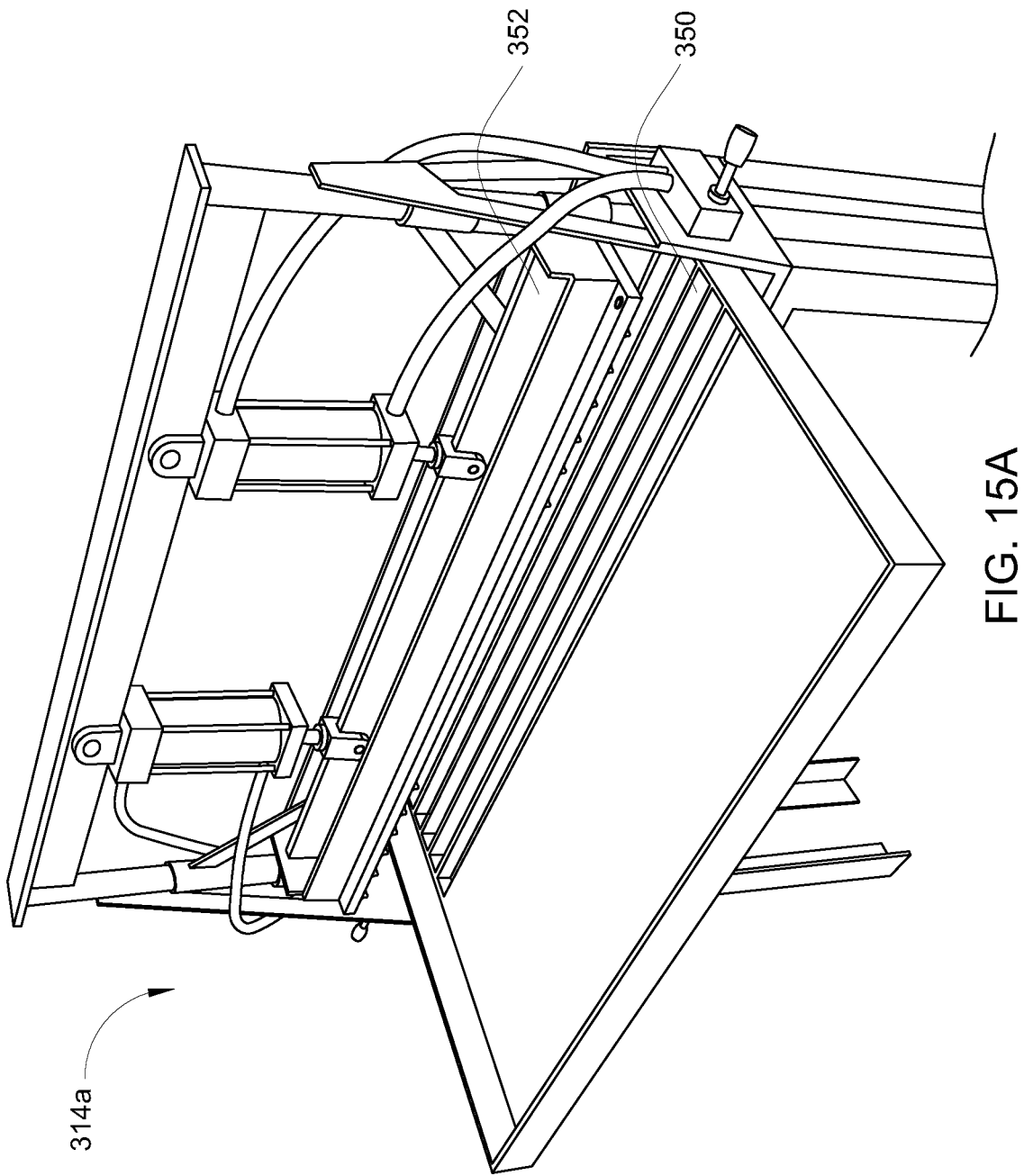
FIG. 15a illustrates a first perspective a crushing substation, in accordance with one embodiment.
Figure 15B:
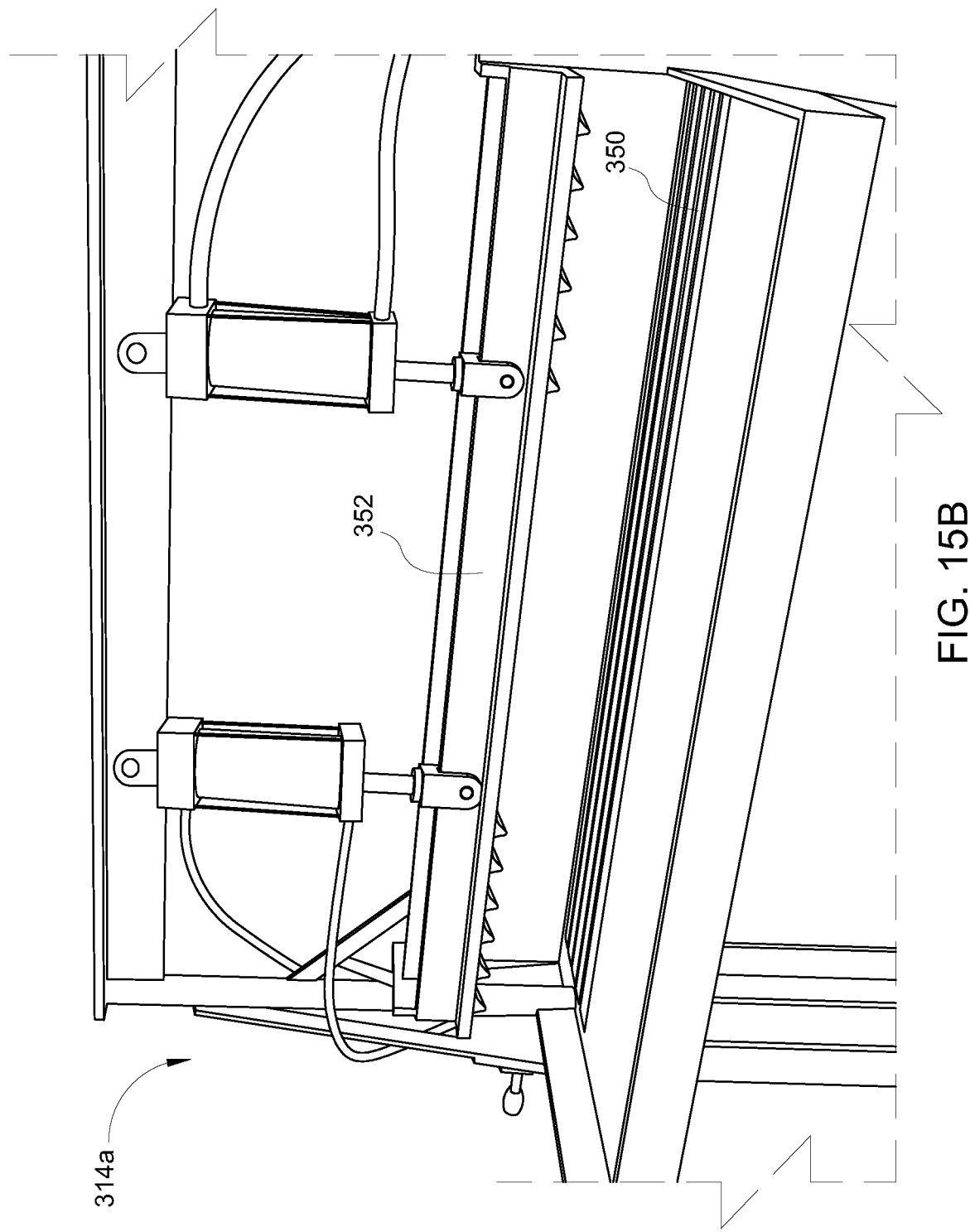
FIG. 15b illustrates a second perspective a crushing substation, in accordance with one embodiment.

FIGS. 15a and 15b illustrates a crushing substation 314a in accordance with one embodiment. The crushing substation includes a substrate with a grid 350 and a mechanical crusher 352 that pushes the ice down through the grid. Alternatively, the crushing substation may comprise pneumatic air pumps and ice picks that are set to turn on and randomly chop the ice.

A stamping substation 314b may be used to impart a design in to the ice. The design may be a logo, lettering, numbering, or other graphic. The stamping substation may include a stamping module 360 and a plurality of stamps 362. In some embodiments, the stamps may be aluminum. The stamps may be embossed, to create a design that is pressed into the ice or engraved, to create a design that is raised from the ice.

Figure 16A:
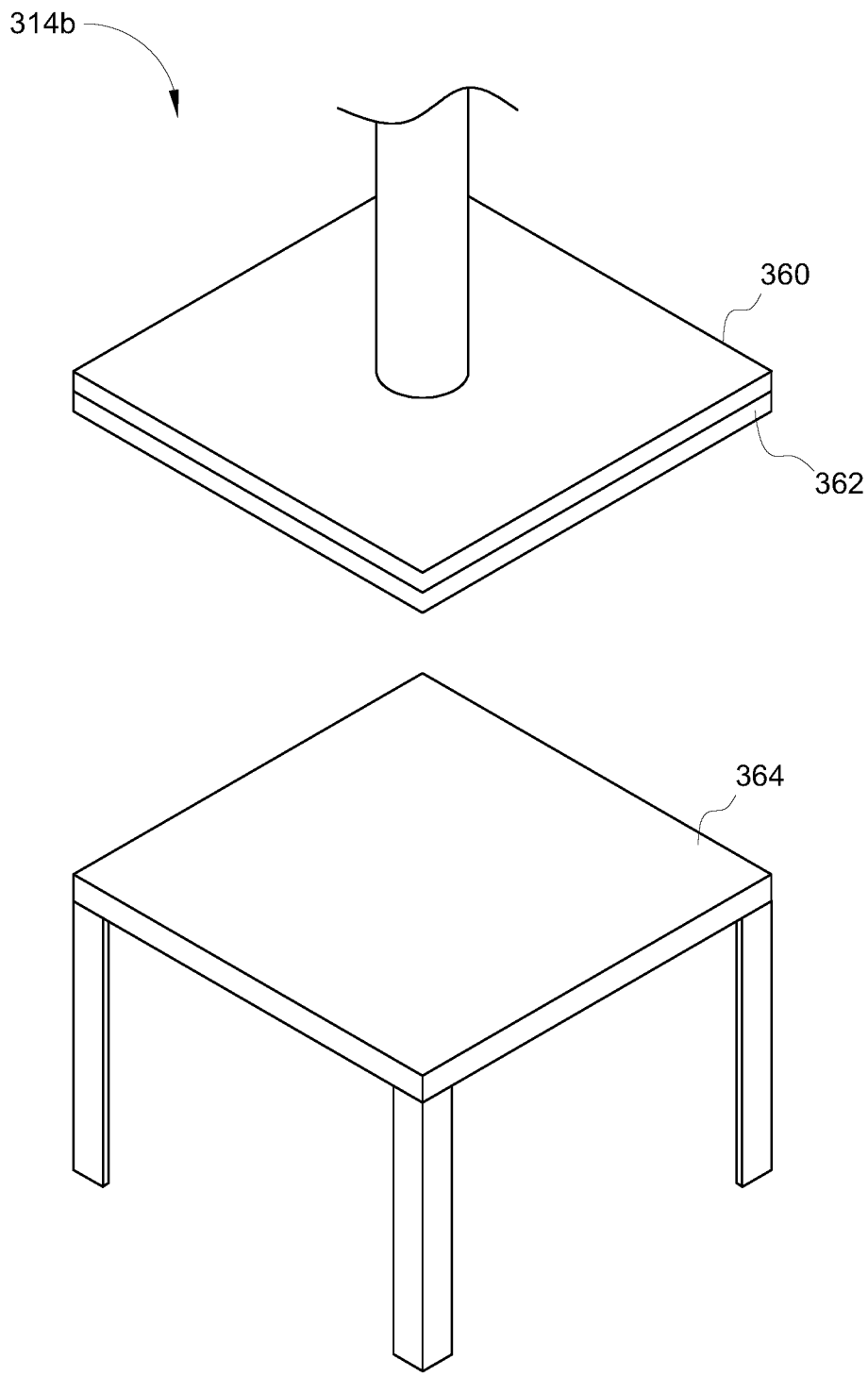
FIG. 16a illustrates a stamping substation, in accordance with one embodiment.

FIG. 16a illustrates a stamping substation 314b. The stamping substation shown is a large scale stamper than can be used to stamp a large portion of an formed ice slob. The stamping substation 314b comprises a support 364 and a stamping module 360. The stamping module 360 is configured for receiving a stamp 362 having a design. Before stamping, the stamping substation 314b may confirm that the proper stamp is loaded in the stamping module. Confirming may be done manually be an operator or automatically, for example by an RIFD Code, Barcode Scan, or similar type of device. In order to stamp the design, the stamp may be heated. Upon reaching an appropriate temperature, the stamp is applied to the ice, such as being pushed down onto the ice for an amount of time. The amount of time may vary depending on the complexity of the design and may be preprogrammed and associated with each stamp such that when the stamp is confirmed, the amount of time for application is read. Heating and application may be controlled automatically by the controller or may be done manually be an operator. After stamping, the stamp module 360 is returned to a set position.

Figure 16B:
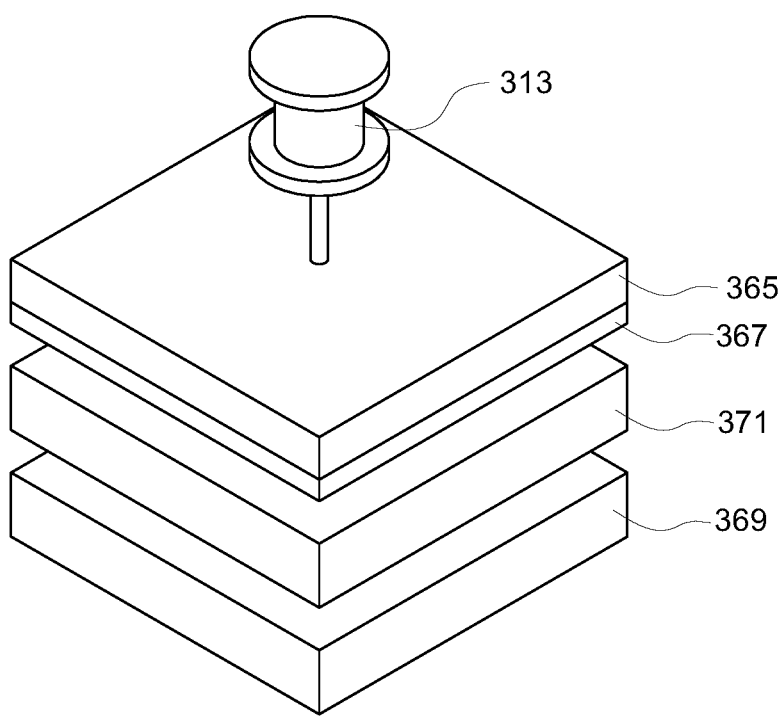
FIG. 16b illustrates an ice press for a stamping station, in accordance with one embodiment.
Figure 16C:
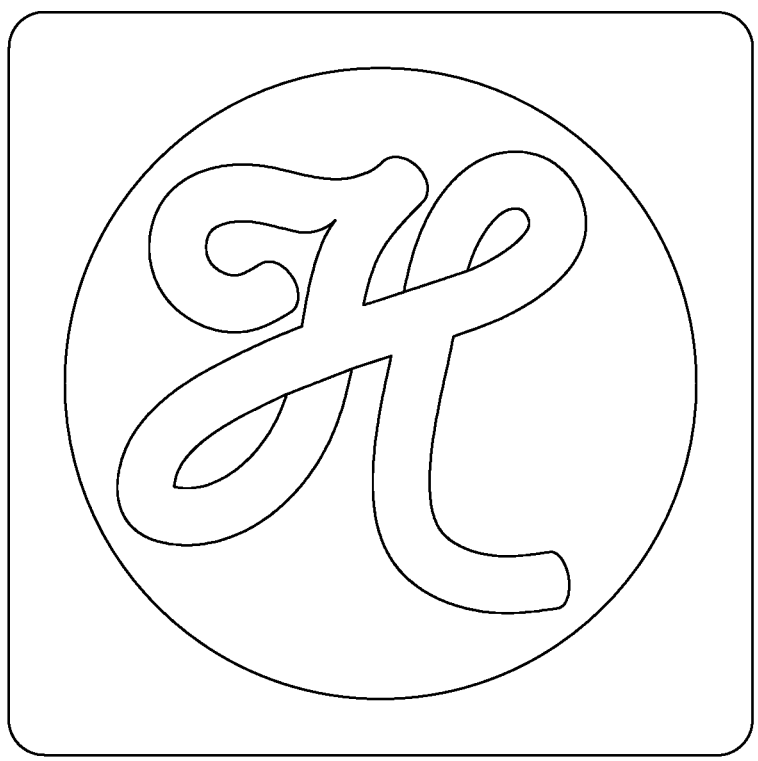
FIG. 16c illustrates stamped ice, in accordance with one embodiment.

FIG. 16b illustrates a cross sectional perspective view of an ice press of a stamping module with stamp. As shown, the stamping module includes a press 313, an upper unit 365 holding a stamp 367, and a base 369. Ice 371 is pressed between the upper unit 365 and the base 369. FIG. 16c illustrates a small scale example of a piece of ice with a single stamp. This may be formed by inserting a series of small stamps 367 into the upper unit 365.

In some embodiments, because stamping involves heating the ice, the ice may be directed to a heating/cooling chamber 308 before further processing. The chamber may be used to clear any excess water on the ice as a result of melting of the stamp into the ice and generally return the ice to a state for further processing. The ice can be returned to the central module 306 for direction to a further processing substation or can be sent directly to a further processing substation.

Figure 17:
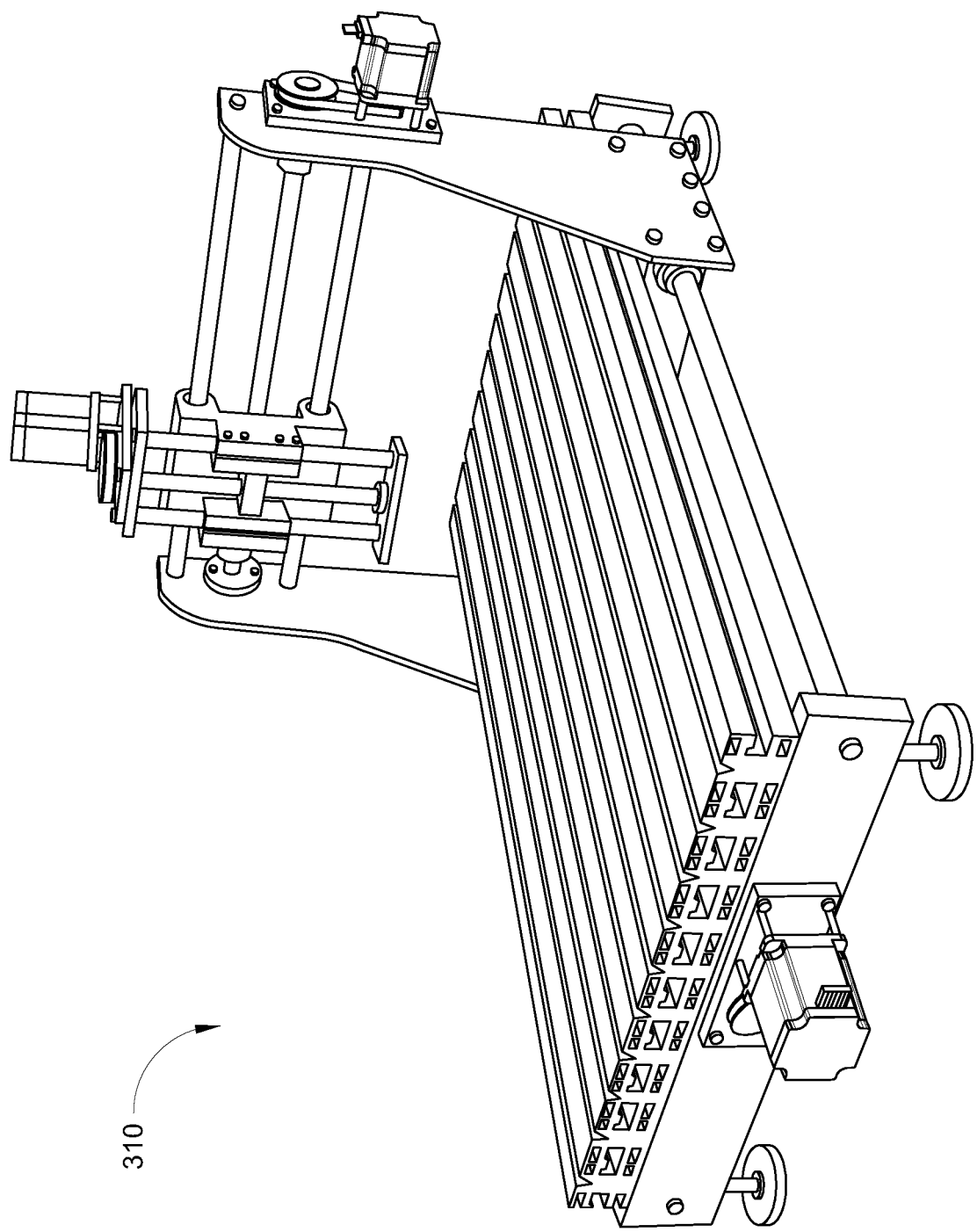
FIG. 17 illustrates a CNC machine, in accordance with one embodiment.

FIG. 17 illustrates a Computer Numerical Controlled (CNC) substation 310, in accordance with one embodiment. The CNC substation 310 may include any or all of a milling device, a gantry, fixation elements, a cleaning tool, a packer and scraper, a color fill device, and a CNC controller, in accordance with one embodiment. Ice may be sent to the CNC substation in a blank state or stamped. The CNC substation 310 is used to etch logos, designs, or graphics into the ice and/or to cut shapes out of the ice. The CNC substation 310 completes this task by taking digitalized data sent from the PLC controller and/or a CNC controller which is created by a computer using a CAM (Computer Aided Manufacturing) or CAD (Computer Aided Design) program. This creates a digital file which controls, automates, and monitors the movement of the CNC machine.

The CNC milling device may be mounted on a gantry and may comprise a laser, router, spindle, lathe, laser, or waterjet. The CNC controller works with an external PC and the PLC controller to receive commands which in turn control the CNC machine. The CNC controller executes the commands to a series of motors and drive components to move and control the machine axes and milling devices executing the programmed motions and cuts.

The CNC controller may include a feedback system that monitors and adjusts the milling speed and position. The monitored data may be relayed back to the PLC controller, CNC controller, and computer. The CNC substation may also relay information back such as tool number, tool dullness, total machining time and other metrics.

The CNC substation 310 receives the ice and fixes it in place with the fixation elements. The ice may be received on a base. In some embodiments, the base is a flat slab of sacrificial ice, discussed more fully below. The fixation elements may be automatic grabbers that put a pressure on the edges of the ice sheet to secure it in place on the base, such as on the sacrificial slab of ice. To assist in securing the ice sheet to the sacrificial slab of ice, the machine may mist or use a heating element to warm the sacrificial layer prior to the ice slab being placed in the CNC module for processing. Placement may be relative the gantry and milling device. The gantry lowers the milling device to the ice and the CNC controller directs the milling device to mill the ice. During milling, snow may be created from the etched ice. The cleaning tool may be used to clean the snow from the ice. Such cleaning too may be, for example, a brush or compressed air. Alternatively, if the slab of ice needs snow packed into the milled areas created by the milling device, the packer and scraper may be directed to pack the snow into the milled areas and scrape off any excess snow after such packing.

In some embodiments, the milled slab of ice may have color applied by the color fill device. In general, to apply color, snow is cleared out of the milled areas and that area is filled with a coloring agent. The coloring agent may be a mixture of paint, gelatin, or enamel that is mixed and dispensed at a programmed temperature set within the PLC The temperature could be manually set or automatically or semi automatically. The color may be directed via a pump or other device to the appropriate areas through a heated nozzle. Due to the nature of the material, the ice may warmed up prior to applying the color to ensure no fractures occur in the ice.

After the design is etched into the ice, snow is packed into the etching. This provides a sacrificial melt for when the ice is placed in, for example, a drink. The snow melts first and the etched design stays visible longer. End mills may be used for packing snow into the etching.

After processing through the CNC substation 310 is completed, the ice may be moved to a further station. This may be manually or automated. In some embodiments, the ice proceeds directly to a packaging module. In other embodiments, the ice moves to the packaging module 312 via a heating and cooling chamber 308. The heating and cooling chamber 308 may include a heated air curtain, such as air heated by a gas torch or heating element, through which the ice may pass to lightly melt snow from the ice. The PLC may control how fast the ice moves through the heating and cooling chamber and the range of temperatures the ice may experience. After the ice has passed through the heated air curtain, it may proceed through a cooling element to cool any melted product below freezing. The cooling element may consist of a blast chiller, air curtain or similar cooling device. The ice may be passed through manually, semi-automatic or automatic.

As previously discussed, the CNC substation 310 may use a flat slab of ice as a base for the ice being cut. To fully cut ice, it is necessary to cut all the way through the ice and the cutter will contact whatever is beneath the ice. By using sacrificial ice as a base, the base is food safe and can be reconstituted. As ice is processed through the CNC substation, the cutting process cuts numerous pieces of ice out of the base ice slab. This can cause the base ice slab to wear down and become uneven and unstable. To prevent or reduce this, the CNC substation 310 can restore the base ice slab as needed between processing of ice. The CNC substation 310 thus may include a refreeze system comprising a self-leveling pan of water, heating coils (located under the base slab of ice), a water fill pump, and a freezer (such as a plate freezer). For minor repairs, water may be misted over the sacrificial ice and the water will adhere as ice.

When the base slab needs to be defrosted and refrozen to ensure a level sacrificial surface of ice, the CNC substation 310 may pause until the refreezing task is completed. This process can be completed manually, semi-automatic or automatic. Refreezing comprises turning on the heating coils, located under the base slab ice, to turn on. These remain on for an allotted amount of time until the ice has melted. The water pump can then be used to add water to restore the base slab of ice to the correct size. The water may be added manually. A water level sensor may be provided to detect when sufficient water has been added. Otherwise if being completed manually, the operator will need to understand how full to fill it. The heating coils are turned off and the plate freezer is turned on. Turning off the heating coils and turning on the plate freezer may be directed by the controller. Freezing may continue for a suitable amount of time for the base ice slab to be frozen and ready for leveling. The milling gantry can be used to load a tool, such as an end mill, for leveling the base slab of ice. Such leveling may comprise directing the milling tool to pass back and further across the surface to level the base ice slab.

Returning now to the ice that is processed through the CNC substation 310, after processing through the CNC substation 310 and (optionally) the heating and cooling chamber 308, the ice may be directed to a packaging module 312 for packaging to a final product condition.

Shaping substations may include, for example a rod substation 318, a cube substation 320, a sphere substation 316, and/or other substations.

A rod substation 318 and/or a cube substation 320 may be provided. Ice may be directed to the rod substation 318 or the cube substation 320 from any suitable point in the converting station. In one embodiment, ice is directed to the rod substation 318 or the cube station 320 from the central module 306. The rod substation 318 is used to convert a slab of ice into ice rods, or long strips of ice. The cube substation 320 is used to convert a slab of ice, or a series of rods, into cubes. Each of the rod substation 318 and the cube substation 320 can be used to convert blank, stamped, or engraved slabs or rods of ice. The cube substation 320 may configured to convert slabs of ice into cubs or to convert rods from the rod substation 318 into square or rectangular cubes. Sacrificial slabs of ice as described above may be used as a base with either or both of the rod substation 318 and the cube substation 320.

The rod substation 318 comprises a pusher, a cutter, and a cleaning tool, in accordance with one embodiment. The pusher may be operated by a chain, stepper motors, hydraulics, traction driven system, vertical reciprocating conveyor, or similar device. The pusher moves the ice through the cutter. The cutter may comprise a set of adjustable saws, circular saws, bandsaws, hot wire, or chopping devices to cut the ice in the predetermined sized as programmed manually or by the PLC. The cutter converts the ice into rods, long thin strips of ice. As the ice slab passes through the cutter, the ice creates snow as a bi-product. The cleaning tool, such as a brush or compressed air, may be used to clear out areas between the cut ice and to keep the tools clean. After the slab of ice has been processed through the rod substation and converted into rods, the rods can be guided and squared up within a transfer substation 302. The transfer substation 302 can move the rods to a cube substation 320 or to a packaging module 312.

The cube substation 320 generally may comprise a pusher, a cutter, and a cleaning tool, in accordance with one embodiment. The pusher may be operated by a chain, stepper motors, hydraulics, traction driven system, vertical reciprocating conveyor, or similar device. The pusher moves the ice through the cutter. The cutter may comprise a set of adjustable saws, circular saws, bandsaws, hot wire, or chopping devices to cut the ice in the predetermined sized as programmed manually or by the PLC. The cutter converts the ice into square prisms or rectangular prisms of different sizes. As the ice slab passes through the cutter, the ice creates snow as a bi-product. The cleaning tool, such as a brush or compressed air, may be used to clear out areas between the cut ice and to keep the tools clean. As the ice slab passes through the cutter, the ice creates snow as a bi-product. The cleaning tool, such as a brush or compressed air, may be used to clear out areas between the cut ice. After the slab of ice has been processed through the cube substation 320 and converted into cubes, the cubes can be transferred to a packaging module 312.

FIGS. 18a-18d illustrate alternative example saw layouts for shaping substations. It is to be appreciates that these are exemplary only and many different configurations and layouts are contemplated and within the scope of the present invention.

Figure 18A:
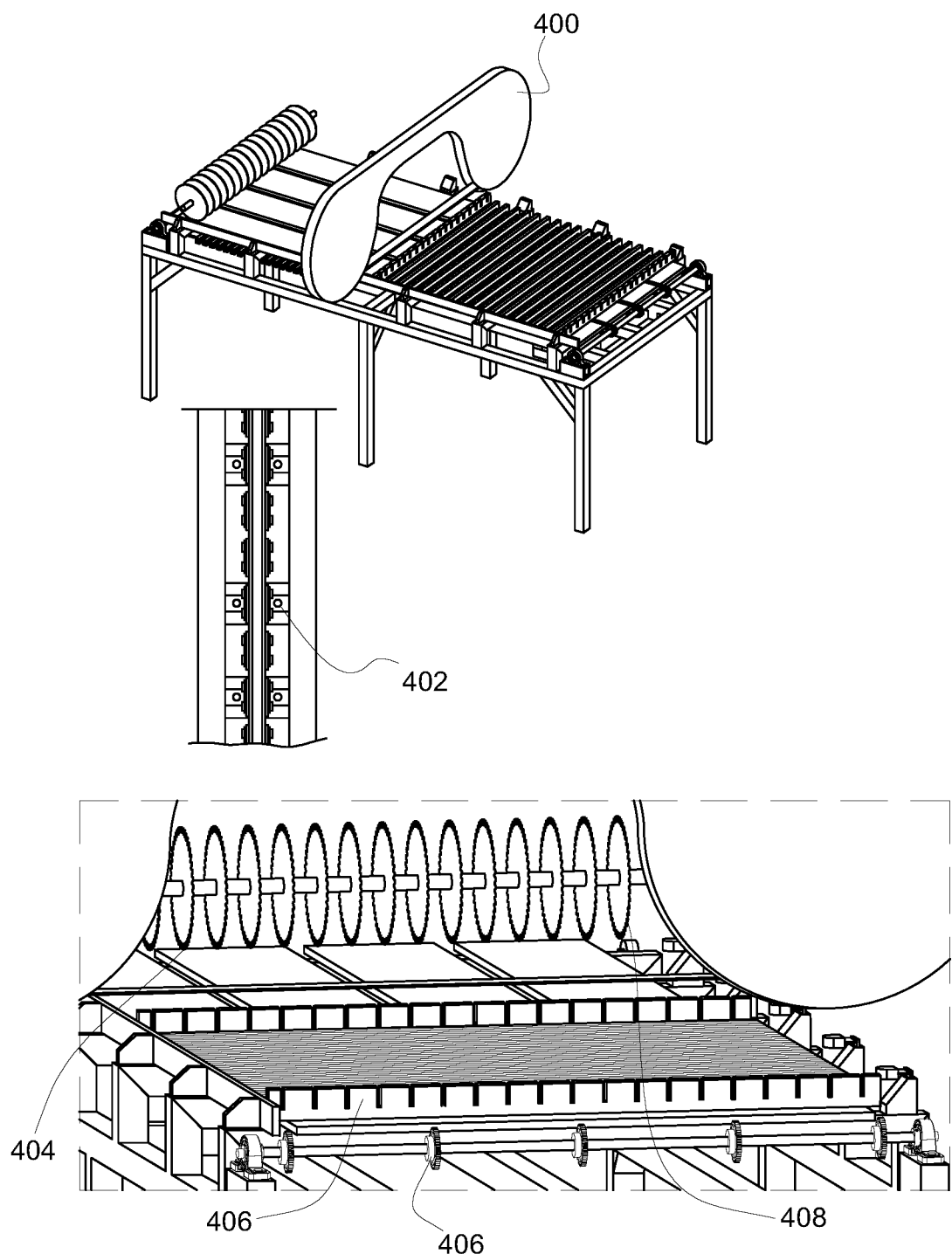
FIG. 18a illustrates a saw layout for a shaping substation, in accordance with a first embodiment.

As shown in FIG. 18a, a band saw 400 may be used to cut the ice block to thickness and for scrap and snow management. Alternatively, this may be provided as part of a separate trim module. A chain drive 402 may be used for driving the ice. Circular saw blades, such as 12" circular saw blades may be provided for cutting the slab of ice. A conveyor with a pusher may push the slab of ice. A dado blade may be provided to eliminate molding draft.

Figure 18B:
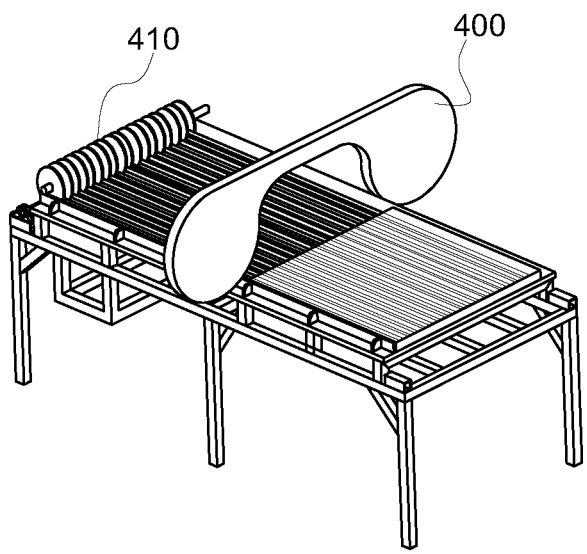
FIG. 18b illustrates a saw layout for a shaping substation, in accordance with a second embodiment.
Figure 18B:
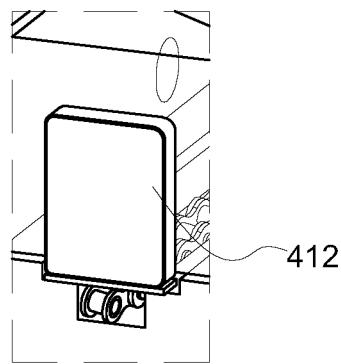
Figure 18B:
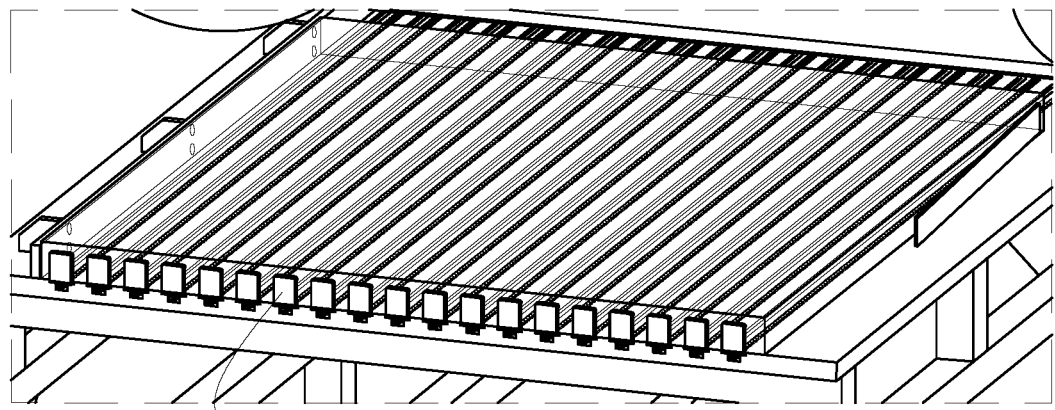

In the embodiment of FIG. 18b, a band saw 400 is shown to cut the ice block to thickness and for scrap and snow management. Alternatively, this may be provided as part of a separate trim module. A chain drive 402 with tabs 412 may be used for driving the ice. A gang saw 410 may be provided for cutting the slab of ice. Chain drives 402 may be used to push the ice under the band saw and through the gang saw.

In the embodiment of FIG. 18c, single comb style pushers and chain floats 420 are used. A plurality of chain drives 422 may be provided to push ice through a gang saw and under the band saw using one single comb pusher 422.

Figure 18D:
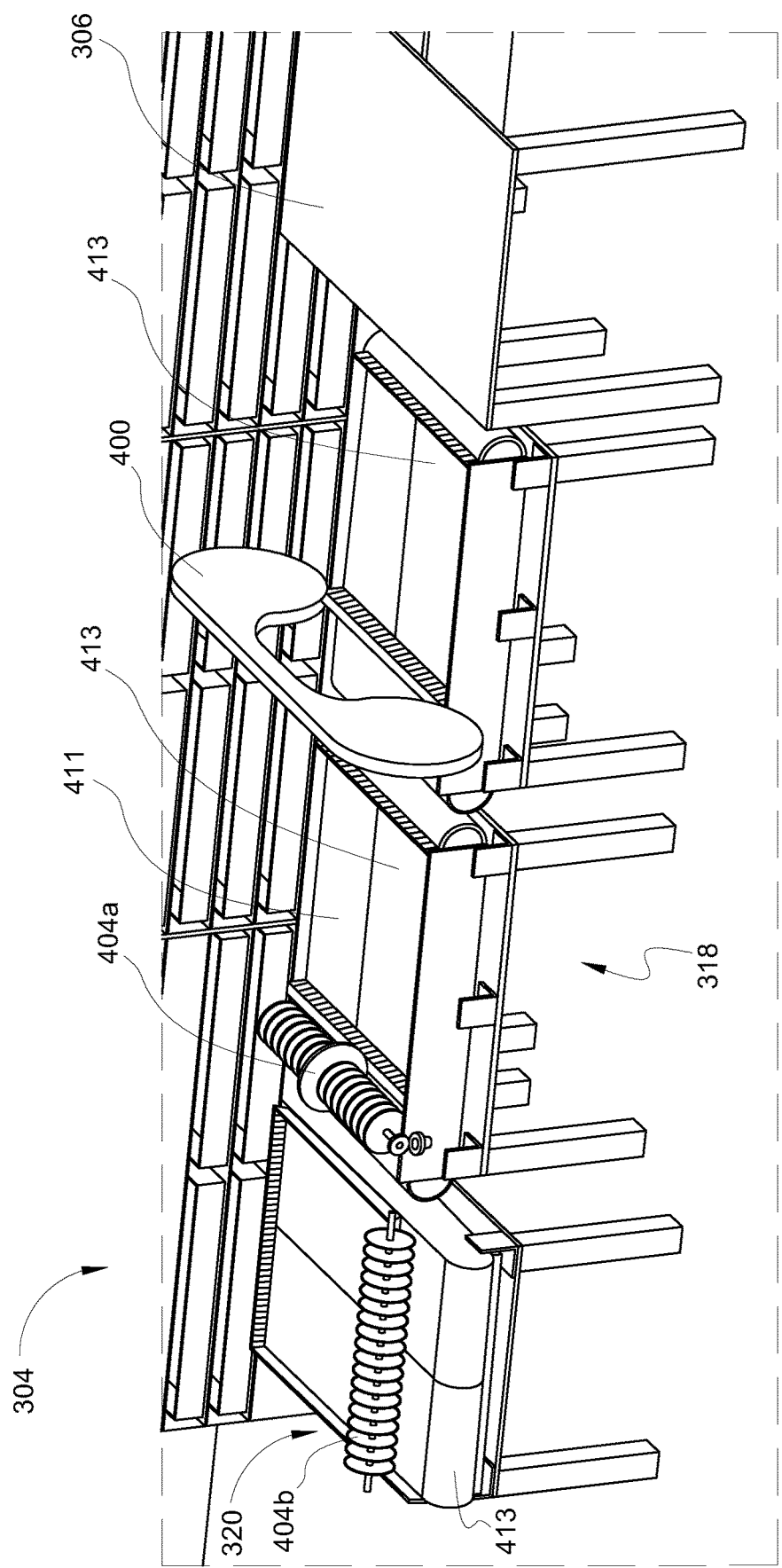
FIG. 18d illustrates a saw layout for a shaping substation, in accordance with a fourth embodiment.

FIG. 18d illustrates an embodiment including the trim module, the rod substation, and the cube substation. A operator hold plate 306 is provided for staging. The ice slab proceeds to the trim module 304, including a band saw 400, for evening the upper surface of the ice slab. Spacing 411 is provided to account for removal of scrap ice before the ice slab proceeds to the rod substation 318, including a first gang saw 404a. As shown, the gang saw may include an optional large diameter saw a t the center that can be used to cut the slab in half only. The cut ice then proceeds to the cube substation 320, having a second gang saw 404a positioned to cross cut the ice. Conveyor belts 413 may be provided for moving the ice through the assembly.

A sphere substation 316 may be provided. Ice may be directed to the sphere substation from any suitable point in the converting station. In one embodiment, ice is directed to the sphere substation 316 from the central module 306. The sphere substation 316 is used to convert a slab of ice into spheres.

Figure 19A:
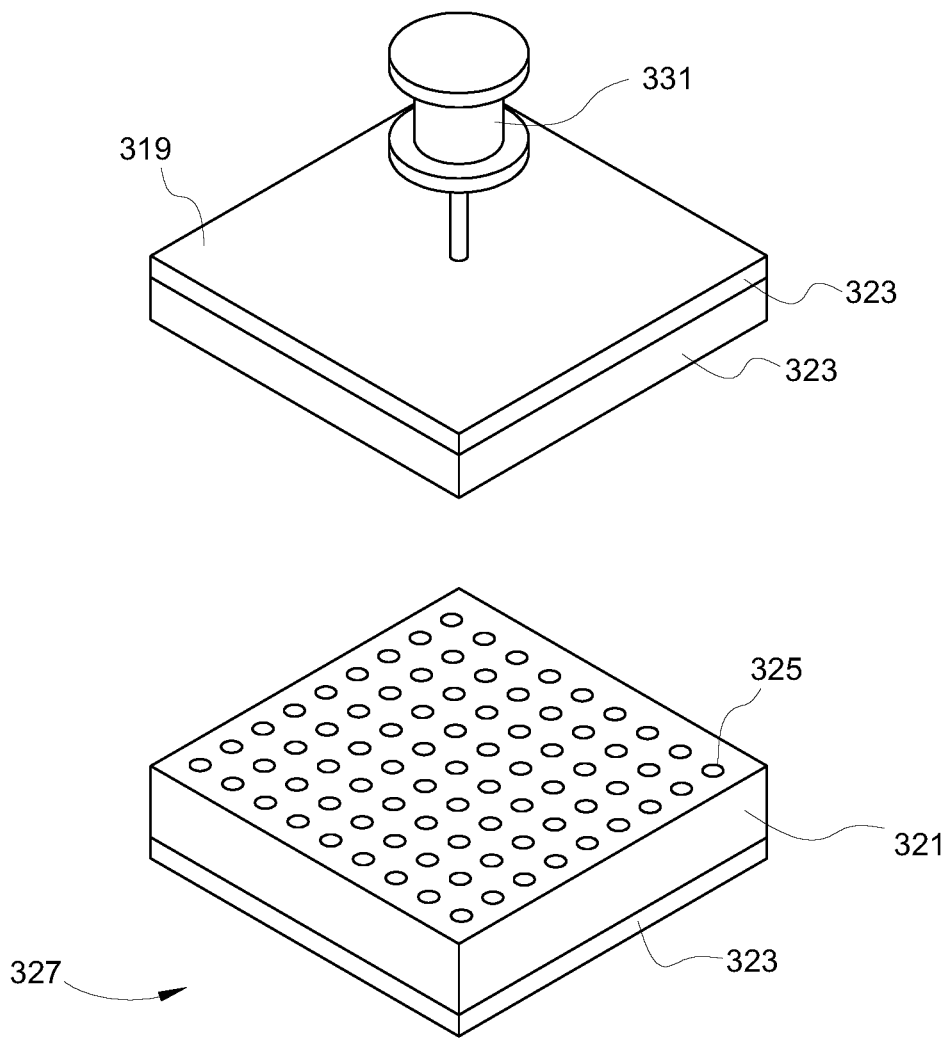
FIG. 19a illustrates a sphere substation, in accordance with one embodiment.
Figure 19B:
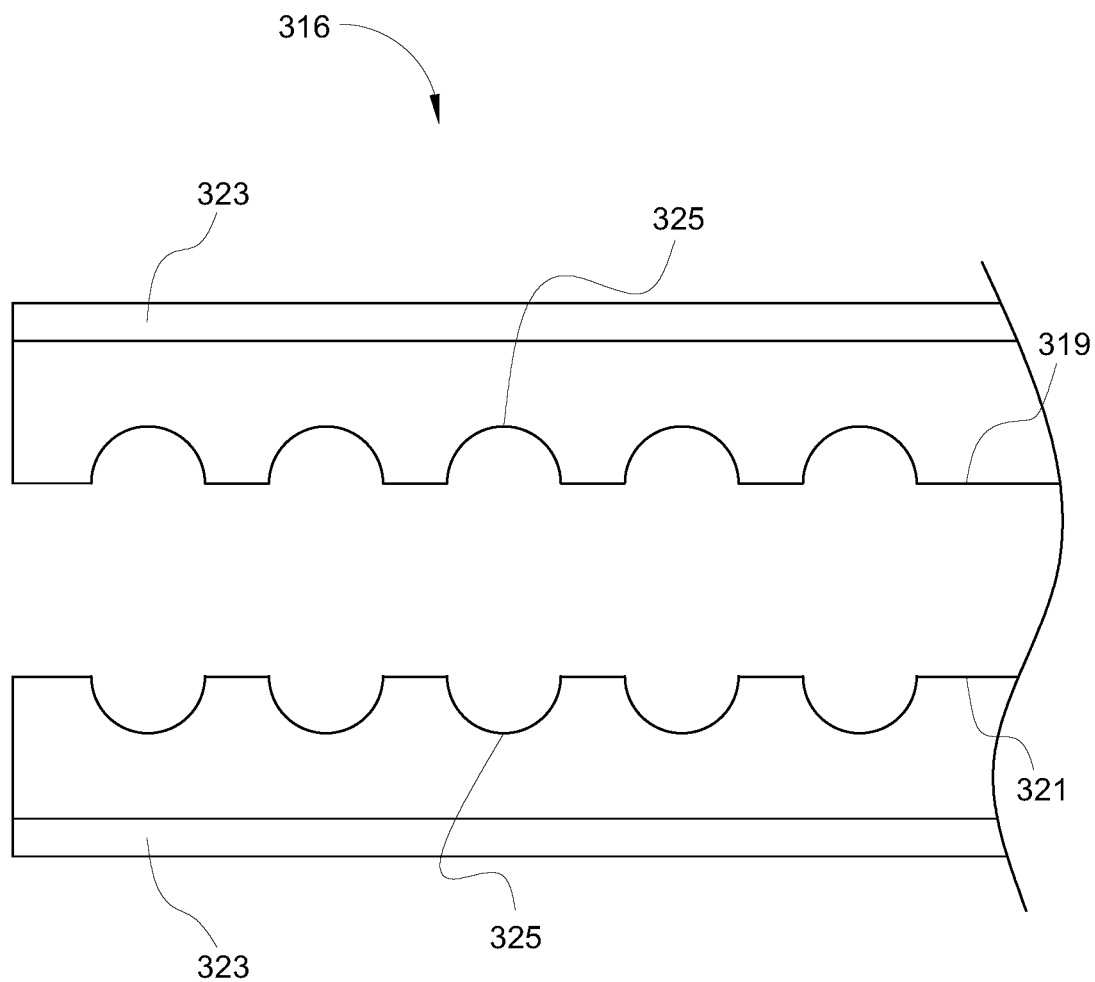
FIG. 19b illustrates a portion of a sphere substation, in accordance with one embodiment.

FIGS. 19a and 19b illustrate aspects of a sphere substation, in accordance with one embodiment. The sphere substation 316 comprises upper and lower plates 319, 321, a heating element 323, and a drain 327, in accordance with one embodiment. The upper and lower plates each comprise half spherical cups 325 placed at intervals. While half spherical cups are specifically described, it is to be appreciated any 3-dimensional shape may be formed using an upper plate and lower plate. The upper and lower plates 319, 321 are pressed towards each other using a pneumatic air cylinder, hydraulic cylinder, or may be gravity driven, screw fed, chain driven. In the embodiment shown in FIG. 19a, the upper plate 319 is lowered using a press 331. When the upper and lower plates 319, 321 are pressed together, ice spheres are formed with the surrounding ice being melted. In the sphere substation, an ice slab may be loaded onto the lower plate. The upper plate 319 is pressed into the top of the slab of ice. The plates are heated to gradually melt the ice. Such heating may be via water, a heating element such as an oil pan heater, a silicone mat heater, heating pad, electrical resistance heating element, air, glycol, hot refrigeration gas, or any other suitable heater.

The two plates are positioned so that each of the half spheres will form a single sphere when the plates make contact. Since there are a number of half spheres per plate, the total number of spheres produced from a slab is determined by the size of the slab and the number of spheres in contact with the slab. After the plates make contact the top plate is pulled up and melt water outside the spheres from the process is drained. The spheres are removed from the lower plate. Such removal may be by lifting the lower plate at an angle to tip them out of the mold, by blowing the spheres out of the mold, using a suction cup, using a robotic arm, manually, or by forming the bottom mold as a false floor that opens up. Because the spheres are heated, the spheres may be sent to a cooling chamber to dry. After drying, the spheres may be moved to a packaging module.

In one embodiment, a system for ice manufacture is provided comprising an automated freezing module, as shown and described with respect to FIG. 3, and an automated demold module, as shown and described with respect to FIGS. 7a and 7b. Further processing such as horizontal trim, customization, conversion, and packaging, may be manual.

In another embodiment, a system for ice manufacture is provided comprising an automated freezing module, as shown and described with respect to FIG. 3, an automated demold module, as shown and described with respect to FIGS. 7a and 7b, and automated trim module. Further processing such as customization, conversion, and packaging, may be manual.

In yet another embodiment, a fully automated system for ice manufacture is provided wherein each of the modules described above is automated and run by a controller. This may be referred to as a "lights out" system.

As used herein, the terms "substantially" or "generally" refer to the complete or nearly complete extent or degree of an action, characteristic, property, state, structure, item, or result. For example, an object that is "substantially" or "generally" enclosed would mean that the object is either completely enclosed or nearly completely enclosed. The exact allowable degree of deviation from absolute completeness may in some cases depend on the specific context. However, generally speaking, the nearness of completion will be so as to have generally the same overall result as if absolute and total completion were obtained. The use of "substantially" or "generally" is equally applicable when used in a negative connotation to refer to the complete or near complete lack of an action, characteristic, property, state, structure, item, or result. For example, an element, combination, embodiment, or composition that is "substantially free of" or "generally free of" an element may still actually contain such element as long as there is generally no significant effect thereof.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

Additionally, as used herein, the phrase "at least one of [X] and [Y]," where X and Y are different components that may be included in an embodiment of the present disclosure, means that the embodiment could include component X without component Y, the embodiment could include the component Y without component X, or the embodiment could include both components X and Y. Similarly, when used with respect to three or more components, such as "at least one of [X], [Y], and [Z]," the phrase means that the embodiment could include any one of the three or more components, any combination or sub-combination of any of the components, or all of the components.

In the foregoing description various embodiments of the present disclosure have been presented for the purpose of illustration and description. They are not intended to be exhaustive or to limit the invention to the precise form disclosed. Obvious modifications or variations are possible in light of the above teachings. The various embodiments were chosen and described to provide the best illustration of the principals of the disclosure and their practical application, and to enable one of ordinary skill in the art to utilize the various embodiments with various modifications as are suited to the particular use contemplated. All such modifications and variations are within the scope of the present disclosure as determined by the appended claims when interpreted in accordance with the breadth they are fairly, legally, and equitably entitled.

What is claimed is:

1. A system for manufacturing clear ice products, the system comprising:
 a converting station for converting an ice sheet to a clear ice product, the converting station comprising:
 a freezer for freezing the ice sheet, wherein the ice sheet has a length, a width, and a height, and wherein the height is less than each of the length and the width;

a cutting mechanism for cutting the ice sheet into shapes;

a sacrificial ice base for receiving the ice sheet, the sacrificial ice base comprising a layer of ice and being positioned below the cutting mechanism.

2. The system of claim 1, further comprising a mold, wherein the mold has a length, a width, and a depth, and wherein the depth is less than each of the length and the width, and wherein freezing the ice sheet is done in the mold, and wherein the freezer is a plate freezer and the mold is positioned on the plate freezer.

3. The system of claim 1, further comprising a refreeze system for refreezing the sacrificial ice base.

4. The system of claim 3, wherein the refreeze system comprises a pan of water, heating coils located proximate the ice base, and a freezer.

5. The system of claim 3, wherein the refreeze system includes a water pump to add water to restore a size of the sacrificial ice base.

6. The system of claim 1, further comprising a customization module or a shaping module.

7. The system of claim 6, wherein the shaping module comprises a crushing substation, a rod substation, a cube substation, or a sphere substation.

8. The system of claim 1, further comprising a pusher for pushing the ice sheet through the cutting mechanism.

9. A method for manufacturing clear ice products, the method comprising:

providing an ice sheet;

positioning the ice sheet on a sacrificial ice base, the sacrificial ice base comprising a layer of ice; and cutting the ice sheet while it is positioned over the sacrificial ice base.

10. The method of claim 9, further comprising misting over the sacrificial ice base and allowing new ice to form on the sacrificial ice base.

11. The method of claim 9, further comprising defrosting and refreezing the sacrificial ice base.

12. The method of claim 11, wherein defrosting and refreezing comprises turning on a heating mechanism located proximate the sacrificial ice base, melting at least a portion of the sacrificial ice base, adding water to restore a height of the sacrificial ice base, turning off the heating coils, and turning on a freezer associated with the sacrificial ice base to refreeze the sacrificial ice base.

13. The method of claim 12, wherein the freezer is a plate freezer.

14. The method of claim 12, further comprising leveling the sacrificial ice base after refreezing the sacrificial ice base.

15. The method of claim 9, further comprising pushing the ice sheet through the cutting mechanism using a pusher.

16. The method of claim 9, further comprising fixing the ice sheet to the sacrificial ice base.

17. The method of claim 9, further comprising heating the sacrificial ice base prior to positioning the ice sheet on the sacrificial ice base.

18. The system of claim 1, further comprising fixation elements for fixing the ice sheet to the sacrificial ice base.

19. The system of claim 18, wherein the fixation elements comprise automatic grabbers configured to put pressure on edges of the ice sheet to secure it in place on the sacrificial ice base.

* * * * *